(12) United States Patent
Kannan et al.

(10) Patent No.: US 8,396,741 B2
(45) Date of Patent: Mar. 12, 2013

(54) MINING INTERACTIONS TO MANAGE CUSTOMER EXPERIENCE THROUGHOUT A CUSTOMER SERVICE LIFECYCLE

(75) Inventors: Pallipuram V. Kannan, Los Gatos, CA (US); Mohit Jain, Bangalore (IN); Ravi Vijayaraghavan, Mountain View, CA (US); Ponnusamy Sam Albert, Bangalore (IN); Vijayalakshmi Amudhan, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 253 days.

(21) Appl. No.: 12/604,252

(22) Filed: Oct. 22, 2009

(65) Prior Publication Data

US 2010/0138282 A1 Jun. 3, 2010

Related U.S. Application Data

(63) Continuation-in-part of application No. 12/392,058, filed on Feb. 24, 2009, which is a continuation-in-part of application No. 11/360,145, filed on Feb. 22, 2006, now Pat. No. 7,761,321.

(60) Provisional application No. 61/107,955, filed on Oct. 23, 2008, provisional application No. 61/108,682, filed on Oct. 27, 2008.

(51) Int. Cl.
*G06Q 10/00* (2012.01)

(52) U.S. Cl. .............. 705/7.42; 705/7.38; 705/7.41; 379/265.06

(58) Field of Classification Search .......... 705/7.38, 705/7.41, 7.42; 379/265.06
See application file for complete search history.

(56) References Cited

U.S. PATENT DOCUMENTS

| | | |
|---|---|---|
| 6,014,647 A | 1/2000 | Nizzari et al. |
| 6,157,655 A | 12/2000 | Shtivelman |
| 6,212,502 B1 | 4/2001 | Ball et al. |
| 6,389,028 B1 | 5/2002 | Bondarenko et al. |
| 6,519,335 B1 | 2/2003 | Bushnell |
| 6,523,022 B1 | 2/2003 | Hobbs |
| 6,615,172 B1 | 9/2003 | Bennett et al. |
| 6,728,363 B2 | 4/2004 | Lieberman et al. |
| 6,798,876 B1 | 9/2004 | Bala |
| 6,859,529 B2 | 2/2005 | Duncan et al. |
| 6,898,190 B2 | 5/2005 | Shtivelman et al. |
| 6,938,000 B2 | 8/2005 | Joseph et al. |
| 6,956,941 B1 | 10/2005 | Duncan et al. |
| 7,027,586 B2 | 4/2006 | Bushey et al. |
| 7,110,998 B1 | 9/2006 | Bhandari et al. |
| 7,120,700 B2 | 10/2006 | Macleod et al. |
| 7,165,037 B2 | 1/2007 | Lazarus et al. |
| 7,181,444 B2 | 2/2007 | Porter et al. |
| 7,215,759 B2 | 5/2007 | Brown et al. |
| 7,269,516 B2 | 9/2007 | Brunner et al. |

(Continued)

FOREIGN PATENT DOCUMENTS

EP 1513088 3/2005

OTHER PUBLICATIONS

Michael S Garver, Using data mining for customer satisfaction research. Marketing Research. Chicago: Spring 2002. vol. 14, Iss. 1; p. 8, 5 pgs.*

(Continued)

*Primary Examiner* — Lynda Jasmin
*Assistant Examiner* — Timothy Padot
(74) *Attorney, Agent, or Firm* — Michael A. Glenn; Glenn Patent Group

(57) ABSTRACT

A customer experience is improved through data mining and text mining technologies and that derive insights about a customer by analyzing interactions between the customer and a customer service agent. One or more numerical measurements of customer satisfaction are derived and recommended actions are provided to an agent to enhance the customer experience throughout a customer service lifecycle.

13 Claims, 19 Drawing Sheets

U.S. PATENT DOCUMENTS

| | | | |
|---|---|---|---|
| 7,353,035 | B1 | 4/2008 | Kupsh et al. |
| 7,398,224 | B2 | 7/2008 | Cooper |
| 7,599,861 | B2 | 10/2009 | Peterson |
| 7,761,321 | B2 | 7/2010 | Kannan et al. |
| 7,778,863 | B2 | 8/2010 | Yoshida et al. |
| 7,792,278 | B2 * | 9/2010 | Watson et al. ............. 379/266.1 |
| 2001/0016814 | A1 | 8/2001 | Hauenstein |
| 2002/0047859 | A1 | 4/2002 | Szlam et al. |
| 2002/0083067 | A1 | 6/2002 | Tamayo et al. |
| 2002/0114442 | A1 | 8/2002 | Lieberman et al. |
| 2002/0156797 | A1 | 10/2002 | Lee et al. |
| 2002/0196926 | A1 | 12/2002 | Johnson et al. |
| 2003/0028448 | A1 | 2/2003 | Joseph et al. |
| 2003/0100998 | A2 | 5/2003 | Brunner et al. |
| 2003/0144895 | A1 | 7/2003 | Aksu et al. |
| 2003/0174830 | A1 | 9/2003 | Boyer et al. |
| 2003/0200135 | A1 | 10/2003 | Wright |
| 2004/0117383 | A1 | 6/2004 | Lee et al. |
| 2004/0141508 | A1 | 7/2004 | Schoeneberger et al. |
| 2005/0004978 | A1 | 1/2005 | Reed et al. |
| 2005/0091038 | A1 * | 4/2005 | Yi et al. ......................... 704/10 |
| 2005/0097159 | A1 | 5/2005 | Skidgel |
| 2005/0147090 | A1 | 7/2005 | MacLeod Beck et al. |
| 2005/0207559 | A1 | 9/2005 | Shtivelman et al. |
| 2005/0234697 | A1 | 10/2005 | Pinto et al. |
| 2005/0246422 | A1 | 11/2005 | Laning |
| 2006/0083362 | A1 | 4/2006 | Anisimov et al. |
| 2006/0277550 | A1 | 12/2006 | Williams et al. |
| 2007/0021966 | A1 | 1/2007 | Ellefson et al. |
| 2007/0043608 | A1 * | 2/2007 | May et al. ....................... 705/10 |
| 2007/0116239 | A1 | 5/2007 | Jacobi et al. |
| 2007/0198323 | A1 * | 8/2007 | Bourne et al. .................. 705/10 |
| 2007/0206584 | A1 | 9/2007 | Fulling et al. |
| 2007/0214000 | A1 * | 9/2007 | Shahrabi et al. .................. 705/1 |
| 2007/0244738 | A1 | 10/2007 | Chowdhary et al. |
| 2008/0167952 | A1 * | 7/2008 | Blair .............................. 705/11 |
| 2009/0097634 | A1 | 4/2009 | Nambiar et al. |
| 2009/0190746 | A1 | 7/2009 | Chishti et al. |
| 2009/0190749 | A1 | 7/2009 | Xie |
| 2009/0222313 | A1 | 9/2009 | Kannan et al. |
| 2010/0262549 | A1 | 10/2010 | Kannan et al. |

OTHER PUBLICATIONS

Ara C Trembly, Mining free-form data enables better customer service. National Underwriter. (Life, health/financial services ed.). Erlanger: Oct. 27, 2003. vol. 107, Iss. 43; p. 42.*

Gans, Noah et al.; *Telephone Call Centers: A Tutorial and Literature Review*; 2003; In Manufacturing and Service Operations Management 5, No. 2, http://www.columbia.edu/~ww2040/tutorial.pdf.

International Search Report and Written Opinion for related PCT application No. PCT/US2009/035071 filed Feb. 25, 2009, date of mailing of ISR May 4, 2009, 11 pages.

Denton, H.; "Call Center Brings Quantifiable Advantages to Bottom Line"; Jul. 1998; Electric Light and Power, p. 17.

Jones, C.; "Entrepreneur Offers Chance to Jump the Queue"; Nov. 19, 2005; Times Higher Education Supplement, No. 1718, p. 8.

International Search Report and Written Opinion for related PCT application No. PCT/US09/61924 filed on Oct. 23, 2009, mailing date of ISR Jun. 8, 2010, 9 pages.

International Search Report and Written Opinion for related PCT application No. PCT/US07/03970 filed on Feb. 15, 2007, mailing date of ISR Oct. 1, 2007, 9 pages.

* cited by examiner

SATNext - Actionable Recommendations

| Area | Analysis | Insights | Recommendations | Impact on CSAT | Impact Time |
|---|---|---|---|---|---|
| Interaction | Top interaction problems that have an impact on CSAT are Plan, Device and Signal/Expiry | MobilePlay customers from 4 regions have lower NES<br><br>Customers having signal problems and enquiring about expiry after 45 days tend to attrite more | Up-sell MobileNext<br><br>Proactively identify/empathize and offer alternatives<br><br>Proactively sign up for signal SMS offer | 47% | 15 to 30 days |
| Process | Top process problems that have an impact on CSAT are Contract Warranty, E-mails, Website and 3rd Party Support | Many customers enquire about the contract expiry date<br><br>Customers would like to know how long their phone is covered under warranty<br><br>Customers receiving scrambled e-mails<br><br>Customers feel that the Support website is difficult to navigate | Provide a service message on the bill<br><br>Improve support website based on VOC recommendations<br><br>Revamp support sites based on VOC query categorization | 28% | 3 to 4 months |
| Product | Top process problems that have an impact on CSAT are Signal problems, Blackberry, Voicemail, and International Roaming | Customers are looking for closest area with good signal<br><br>Customers and several questions and issues in setting up email and internet connectivity<br><br>Customers complain about delay in the voice mail delivery<br><br>Customers are using chat to ask about roaming charges when they are traveling abroad | Provide an email/brief web video describing how to set up a Blackberry for email and internet connectivity<br><br>Send a free SMS with roaming charges to international travelers and provide roaming charge information in the FAQ pages | 15% | 4 to 8 months |

FIG. 2C

| Query Type | Query Category | Query Sub-Category | Q1-2008 | Q2-2008 |
|---|---|---|---|---|
| PRICE | APR | 0% APR General | 4.60% | 5.00% |
| | | 0% APR on Balance Transfer | 1.20% | 1.30% |
| | | Any APR on Balance Transfer | 0.60% | 0.60% |
| | | Interest Rates | 14.90% | 15.20% |
| | | Lower Interest | 12.90% | 15.20% |
| PROCESS | APPLYING | Additional Requirements | 3.70% | 3.80% |
| | | Application Status Enquiry | 3.40% | 2.60% |
| | | Expressing Need | 13.80% | 13.80% |
| | | Before Applying | 0.40% | 0.30% |
| | | Procedural | 13.30% | 13.80% |
| | | After Applying | 3.90% | 4.20% |
| | OBJECTIONS | Postponement | 12.20% | 11.90% |
| | | Turn Down/Doubtful | 22.00% | 21.00% |
| | | Verification | 6.70% | 7.30% |
| PRODUCT | CARD RELATED | Card General FAQ | 12.90% | 12.70% |
| | | Card Rebuttals | 1.10% | 0.80% |
| PROMOTION | MILES AND POINTS | Benefit Enquiry | 18.90% | 17.80% |
| | | Redeeming | 2.40% | 2.30% |
| | | Status Enquiry | 0.20% | 0.10% |

*FIG. 4E*

MINING INTERACTIONS TO MANAGE CUSTOMER EXPERIENCE THROUGHOUT A CUSTOMER SERVICE LIFECYCLE

CROSS REFERENCE TO RELATED APPLICATIONS

This patent application is a continuation-in-part of U.S. patent application Ser. No. 12/392,058, Apparatus and Method for Predicting Customer Behavior, filed Feb. 24, 2009, which is a continuation-in-part of U.S. patent application Ser. No. 11/360,145, System and Method for Customer Requests and Contact Management, filed Feb. 22, 2006, now U.S. Pat. No. 7,761,321 the entirety of each of which are incorporated herein by this reference thereto. This patent application claims the benefit of U.S. provisional patent application Ser. No. 61/107,955, Text Mining in Customer Service, filed Oct. 23, 2008, U.S. provisional application Ser. No. 61/108,682, Quality Assurance Through Text Mining, filed Oct. 27, 2008, the entirety of each of which are incorporated herein by this reference thereto.

BACKGROUND OF THE INVENTION

1. Technical Field

The invention relates generally to the field of customer service quality assurance management. More specifically, the invention relates to data-mining customer-agent interactions and survey data for ensuring quality customer service experience throughout a customer service lifecycle.

2. Description of the Related Art

Customer service management traditionally includes conducting a service call between a customer and a customer service agent and recording information about the interaction after it ends. The step of recording performance of a customer service representative is most often carried out by the customer service agent personally through self-reporting. Other times, a customer is asked to fill out a survey relating to the call subsequent to the interaction. In the vast majority of cases, the survey asks the customer to comment on a variety of topics, i.e. operational metrics. However, this approach focuses only on analyzing previously-identified operational metrics and typically does not involve all of the information that is important to an individual customer. Indeed, these traditional mechanisms return little information and oftentimes no useful information.

The traditional mechanisms are also limited to the type of information that they are able to gather about the level of customer service offered by an agent during an interaction. First, in the case of agent self-reporting, an agent has an inherent bias to stress the positive aspects of the service call and downplay the negative ones. Furthermore, the agent may not even realize what went right during a call or what went wrong because the customer may hide their true disposition. Likewise, customer surveys are limited to quantifiable answers indicated with checkboxes and do not convey enough information for robust analysis. Also, current strategies of customer service data gathering do not provide for specific customer responses to specific questions designed by a particular manufacturer or vender of goods and services. Likewise, they do not allow for unconstrained customer feedback in a useful manner.

Furthermore, current solutions do not delve into the reasoning behind the answers to surveys. Additionally, surveys are susceptible to sample bias since the responses are offered by a self-selected segment of customers, i.e. those who are either very satisfied or very dissatisfied. Also, sample sizes are currently too small for a robust analysis. Additionally, current solutions cannot evolve based on changing customer needs and perception.

SUMMARY OF THE INVENTION

The invention relates to improving customer experience through data mining and text mining technologies and through deriving insights about a customer by analyzing data-mined interactions between the customer and a customer service agent.

According to preferred embodiments of the invention, a multifaceted approach is followed for managing customer experience throughout a customer lifecycle. Customer experience management focuses on survey data and customer-agent interactions. These interactions include, but are not limited to: phone calls, online chat, emails, surveys, focus groups, forums, blogs, and social media interactions. The multifaceted solution includes making one or more numerical measurements of customer satisfaction for deriving recommended actions for an agent to enhance the customer experience. The multifaceted solution also includes tools for developing customer models to predict customer reactions and expectations for future interactions.

In some embodiments of the invention a distributed computer architecture uses a central data fusion engine for gathering customer service data from a plurality of sources and delivering business insights to clients by processing the data using one or more specific processing modules. Preferably, a dynamic interaction feedback loop is included in the architecture.

In some embodiments of the invention, a quality assurance process measures and analyzes the abilities of an agent and provides feedback after data-mining a customer-agent interaction. The quality assurance process is uses structured data, unstructured data, and combinations of structured data and unstructured data.

In some embodiments of the invention, a plurality of processing modules ingest gathered data that is relevant to customer satisfaction and output one or more business insights. These modules include a problem type/query type categorization module, a web text mining module, an area of customer service improvement opportunity identification module, a cognitive category model module, a neurolinguistics processing module, a statistical modeling module, an insight generation module, a competition analysis module, a chat summarization module, a proactive problem prediction module, an agent survey module, and combinations thereof.

BRIEF DESCRIPTION OF THE DRAWINGS

FIG. 4E is a graphical representation of another exemplary deliverable insight that categorizes queries related to loan products according to some embodiments of the invention;

DETAILED DESCRIPTION OF THE INVENTION

The invention comprises an apparatus, system, and method for measuring a customer experience and customer satisfaction, and for delivering insights relating to the same. In some embodiments of the invention, a central processing module gathers information relating to the customer experience and customer satisfaction and fuses the gathered information. In some embodiments of the invention, a plurality of modules process gathered data to measure the customer experience and customer satisfaction and output one or more useful business insights.

In the presently preferred embodiments of the invention, the central processing engine returns one or more outputs after processing the gathered information. In some embodiments of the invention, the output comprises a statistically robust way to measure key drivers of customer experience, actionable recommendations on how to change the key drivers affecting customer experience to the floor of a customer service agency, or combinations thereof.

In the presently preferred embodiments of the invention, a distributed computer architecture includes a central processing engine comprising a data fusion engine for processing gathered customer service data to formulate useful insights and for managing customer experience over time.

Data Fusion Engine

Figure 1:
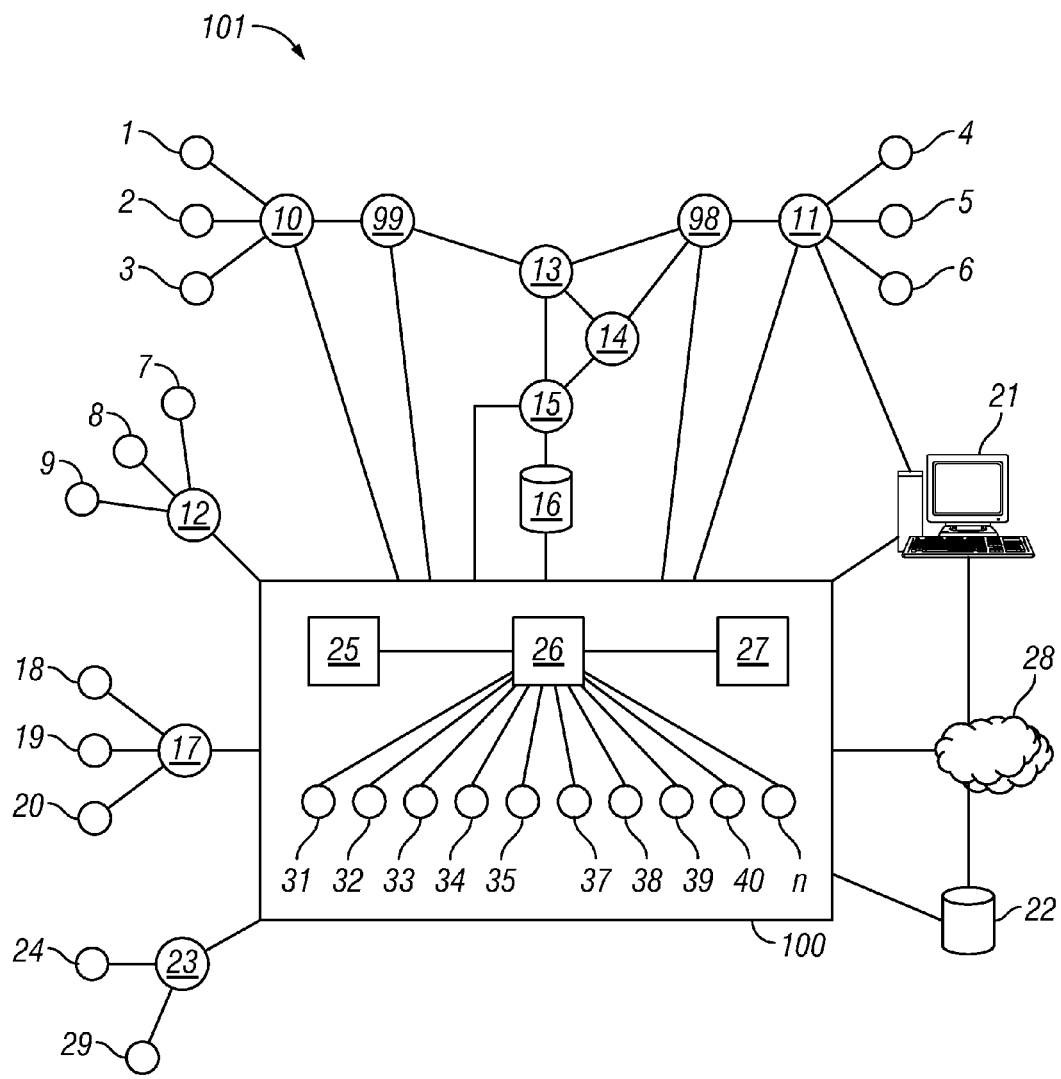
FIG. 1 illustrates a data fusion engine for managing a customer experience throughout a customer service lifecycle according to some embodiments of the invention.

FIG. 1 illustrates a system 101 for managing customer experience throughout the customer service lifecycle comprising a data fusion engine 100, a customer profile repository 10, an agent profile repository 11, an interaction platform 13, an industry metric module 17, a survey module 23, and a community data repository 12. The data fusion engine 100 gathers data from a number of sources, compiles the relevant information, analyzes the information, and presents the information in a useful form for managing the customer's service experience throughout the lifecycle of a relationship between a customer and customer service provider.

The data fusion engine comprises an input/output interface 25 for receiving information from one or more channels and for transmitting information via a communications network 28, such as the Internet. The input/output interface 25 is coupled with a processor 26. The processor 26 processes the information and stores processed data into a memory 27. In some embodiments of the invention, processed data is stored in an external database 22 or sent to an external computer 21, either directly or via the communications network 28, such as the internet. Additionally, the processor 26 is coupled to a clock (not shown) that is used to provide temporal data relating to the gathered information with a time stamp.

The data fusion engine 100 gathers information from one or more channels. For the purpose of this disclosure, any communication means for transferring information between electronic devices now known, or later developed may be used for gathering information. For example, some communication means include, but are not limited to: a data packet transfer via a TCP/IP communication protocol, proprietary communication protocols, phone calls, text messages (such as SMS format text messages), multimedia data messages (such as MMS format messages), structured email messages, structured instant messaging messages, structured browser-based chat messages, uploaded website comments, and traditional postal mail or courier communications.

In some embodiments of the invention, the customer profile repository 10 stores information about one or more customers 99. The customer profile repository 10 stores customer-agent interaction data 1, customer relationship management (CRM) data 2, and geo-demography based information 3. The CRM data includes all of the information gathered from a customer throughout the lifecycle of a customer service relationship. Although specific types of stored data are set forth explicitly, it will be readily apparent to those with ordinary skill in the art, having the benefit of this disclosure, that the customer profile repository 10 can store a wide variety of other customer history, demographics, and the like.

In some embodiments of the invention, the agent profile repository 11 stores information about one or more customer service agents 98. The agent profile repository 11 stores agent profile data 4, including demographic data, tenure data, experience data, and test scores. In some embodiments of the invention, the agent profile repository 11 stores agent quality assurance data including communications skills data, product knowledge data, and problem resolution score data.

In some embodiments of the invention, the agent profile repository 11 stores agent performance data including call satisfaction (CSAT) scores, agent performance scores (APS), and productivity metrics. Although specific types of stored data are set forth explicitly, it will be readily apparent to those with ordinary skill in the art, having the benefit of this disclosure, that the agent profile repository 11 can store a wide variety of other agent history, demographics, and the like.

According to the above embodiments of the invention, the customer profile repository 10 and the agent profile repository 11 communicate the stored information to the data fusion engine 100 via one or more communication channels. In some other embodiments of the invention, the data fusion engine 100 gathers information directly from a customer 99 or from the customer service agent 98 via one or more channels. Additionally, customer 99 and agent 98 interaction data is communicated to the data fusion engine 100, as explained in more detail below.

In addition to the data gathered from customers 99 and agents 98, the data fusion engine 100 gathers other data that is relevant to customer experience. For example, the data fusion engine 100 gathers information from an industry metric module 17. In some embodiments of the invention, the industry metric module 17 stores industry accepted standard customer experience/satisfaction measures such as American customer satisfaction index (ACSI) information 18, a Net Promoter score 19, and a score from J.D. Power and Associates 20.

Likewise, the data fusion engine 100 gathers information from one or more survey modules 23. The survey module 23 stores survey results 24, net experience scores, customer satisfaction scores and ratings, agent performance scores, etc., and verbatim survey data 29.

In some embodiments of the invention, surveys are given to both customers and agents. According to these embodiments, a comparison between the customer survey and the agent survey reveals useful insights. For example, a customer may report a negative interaction experience because the agent was unable to give the customer a particular requested service. However, the company employing the agent may restrict the agent from giving customers the requested service. Therefore, the agent can self-report that they performed well in light of a customer asking for a service that they were unauthorized to provide. Comparing the results of the customer survey and the agent survey shows that the real cause of the customer's dissatisfaction was that the agent was not authorized to provide the service, and not that the agent was inept. The comparison effectively identifies things that are out of the agents' control and gives the agency more useful feedback.

In some embodiments of the invention, the data fusion engine 100 gathers information from an online community data repository 12. For example, a community data repository 12 can gather relevant data from online forums 7, blogs 8, and short message format personal media feeds 9, such as those media feed services provided by Twitter©, Inc., located in San Francisco, Calif.

The information gathered by the data fusion engine 100 may be comprised of structured data, unstructured data, or a combination of structured data and unstructured data. In some embodiments of the invention, unstructured data comprises free text, raw audio data, raw video data, and combinations thereof. For example, free text may be provided by chat data, email data, and blogs, among other sources.

According to those embodiments involving unstructured data, the data fusion engine 100 includes one or more engines, i.e. rasterizing, optical character recognition, voice-to-text transcription, etc, for structuring the data and merging it with other structured data.

Interaction Data

As explained above, the data fusion engine also gathers information from interactions between a customer 99 and an agent 98 via an interaction module 13 for analyzing agent-customer interaction. The interaction module 13 saves agent-customer interactions by transcription, audio recording, video recording (in the case of video chats), audio-visual recordings, and combinations thereof. Customer-agent interactions include interactions selected from among phone calls, online chat, emails, surveys, focus groups, forums, blogs, and social media interactions, among other interactions.

In some embodiments of the invention, unstructured interaction data is mined using a hybrid process that includes manually building a lexicon and one or more statistics-based classification models. Next, a series of rules are formed about the lexicon to predict customer satisfaction based on the words they use. The rules derived from interaction data are then used to predict the satisfaction of customers during future interactions.

In some embodiments of the invention, the interaction module 13 is coupled with an interaction feedback module 14. According to these embodiments of the invention, the memorialized interaction data is processed in order to provide useful feedback to an agent 98. The interaction feedback module 14 is explained in greater detail below.

An interaction data mining engine 15 is coupled to the interaction module 13 and the interaction feedback module 14. Furthermore, the interaction module 13 performs data-mining on the saved interaction data to obtain data that is in a structured or quasi-structured format. In some embodiments of the invention, the data is sent to a database 16 for storage, or sent directly to the data fusion engine 100. The data mining engine 15 extracts a plurality of interaction attributes including, but not limited to, actual vocabulary used, contextual information, tone, speech rate, inflection usage, dialect, etc. A number of other interaction attributes are set forth in greater detail below. Additionally, those with ordinary skill in the art, having the benefit of this disclosure, will appreciate that the data mining engine 15 may extract additional information not listed, and may be updated with new software to fix problems or to add functionality developed in the future.

Customer Experience Improvement Module

The data fusion engine 100 also contains a plurality of customer experience improvement modules 30, 31, . . . 40, n. Briefly, the customer experience improvement modules 30, 31, . . . 40, n each ingest the information gathered from one or more of the various sources of information and produce one or more useful insights as an output. The details of how each of these customer experience improvement modules 30, 31, . . . 40, n operates are set forth in detail below.

The output of the data fusion engine 100 comprises one or more useful results that increase customer service quality. For example, the output may provide business insights relating to products, processes, price of goods and services, insights into sales promotions, and insights into customer service agent effectiveness.

Below is a summary of insights derived from the data fusion engine 100 of the invention.

Product Insights:
    Insights relating customer satisfaction to product features same correction in the rest;
    Insights relating to customer satisfaction with product requirements;
    Insights relating to customer expectations; and
    Insights relating to overall customer satisfaction with a particular product.

Customer Service Process Insights:
    Insights relating to how well customers understand the customer service process;
    Efficiency and effectiveness of customer service process from a customer view point;
    Insights relating to customer satisfaction with policy; and
    Insights relating to agent competency.

Pricing Insights:
    Effectiveness of price;
    An understanding relating to the value of goods or services;
    An understanding relating to competing goods or services;
    The effectiveness of promotional offers;

The effectiveness of discounts; and
Customer satisfaction with pricing.
Sales Promotion Insights:
Price-Offer-Discount insights;
Brand equity insights;
Offer acceptance insights;
Reward promotion insights; and
Satisfaction insights.
Agent Effectiveness Insights:
Behavior insights;
Competency insights;
Advisory effectiveness;
Complaint insights;
Customer treatment insights; and
First call resolution insights.

The output of the data fusion engine 100 may be stored in a database 22 that is accessed either directly or through a communications network 28. Likewise, the output may be sent to one or more computers 21 that are accessed either directly or through a communications network 28. Likewise, the output may be sent directly to one or more customer service representatives, including the agent 98, the agent's manager, a third party, or the like. It will be obvious to those with ordinary skill in the art, having the benefit of this disclosure that the output may be sent to a variety of entities by a variety of means to accomplish the goal of increasing customer service satisfaction.

Subscription Based Use of Data Fusion Engine

In some embodiments of the invention, the data fusion engine 100 comprises a central server that manages a plurality of customer service agents 98. Accordingly, the data fusion engine 100 is coupled with the agent profile repository 11. According to these embodiments, a customer service agency or company that conducts internal customer service management subscribes to a service that offers the use of the data fusion engine 100.

Once a subscription is established, the customer service agency (or customer service agents internal to a business or organization) can more effectively manage the customer service experience by having access to the robust amount of information gathered by the data fusion engine 100. The customer service agency (or customer service agents internal to a business or organization) can also more effectively manage customer satisfaction throughout a customer lifecycle for any number of clients, wherein each of the clients may offer any number of products, goods, and services.

In the presently preferred embodiment of the invention, the business insights that are output from the data fusion engine 100 are fed back to the data fusion engine 100 for purposes of analysis and to train individual customer service agents. Accordingly, the customer service agents learn insights from the data fusion engine 100 that improve the customer service experience in future customer interactions.

Customer Service Lifecycle

In the presently preferred embodiment of the invention, the process of managing customer experience extends throughout the customer service lifecycle. For example, mining a single customer-agent interaction for data yields only a small amount of insight about that particular interaction. However, mining customer-agent interaction data over a period of weeks, months, or even years provides a much greater magnitude of information and yields more robust and accurate insights.

In the presently preferred embodiment of the invention, the data fusion engine 100 analyzes many customer-agent interactions over an extended period of time and learns insights from the interactions. The process then reports the insights to an agent to enhance their ability to improve customer service satisfaction in the future.

Figure 2A:
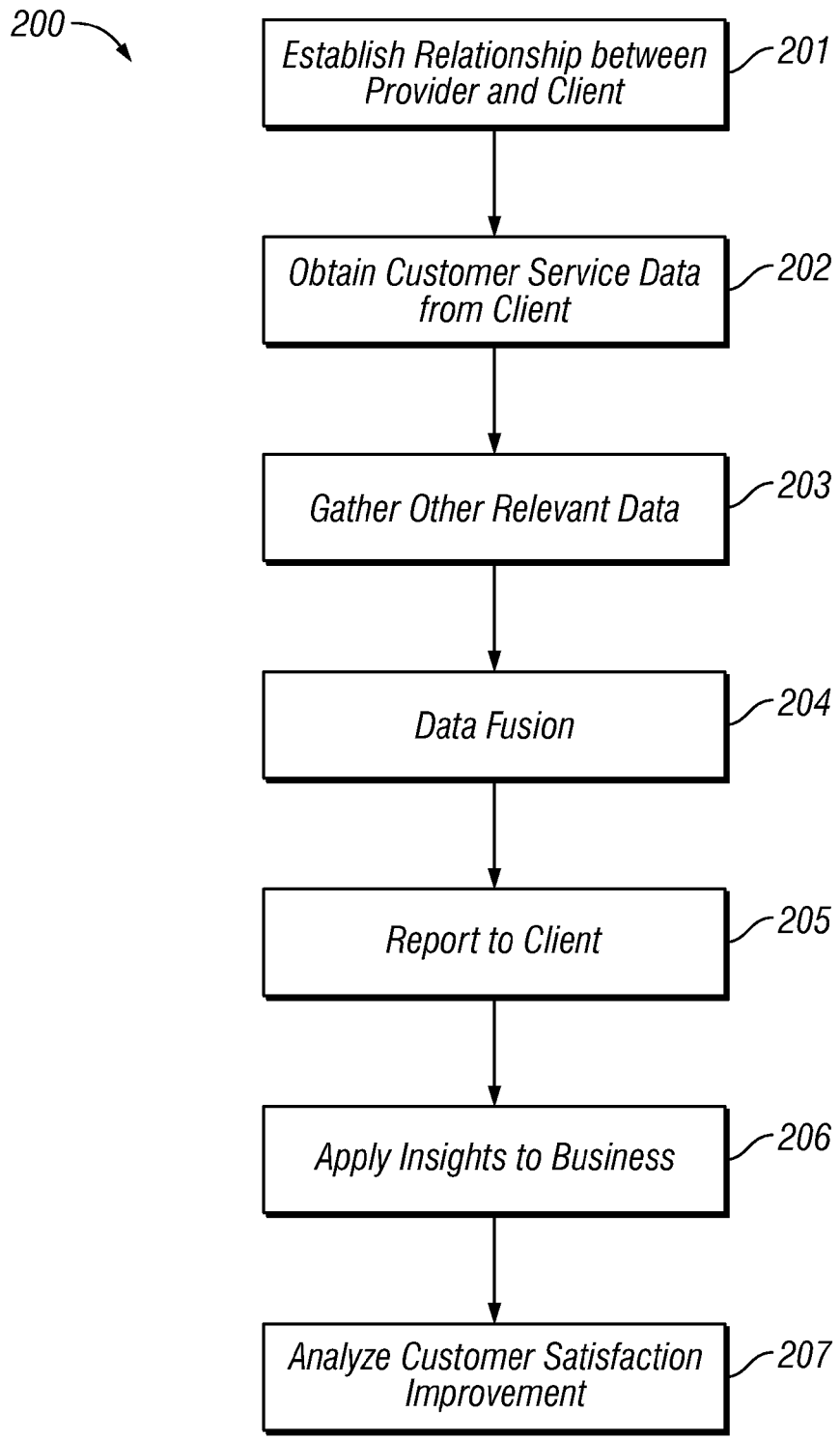
FIG. 2A illustrates an example of a method for increasing the customer experience using a data fusion engine according to some embodiments of the invention.

FIG. 2A illustrates an example of a method 200 that increases a customer's experience by using a data fusion engine according to some embodiments of the invention. The method 200 first establishes a relationship between a service provider of the data fusion service and a client 201. An example of a service provider is 24/7 Customer, Incorporated, located in Campbell, Calif., U.S.A. Examples of clients include customer service agencies and individual companies who manage their own customer service needs. In some embodiments of the invention, the relationship between the provider and the client include subscriptions, licenses, etc.

The method 200 for increasing the customer experience continues when a client delivers customer service data to the provider 202. Customer service data includes, but is not limited to, agent-customer interaction records, voice recordings, CRM data, call quality data, disposition data, verbatim notes, and survey data. Next, the method 200 for increasing the customer experience gathers other forms of relevant data 203 such as community data, industry data, and previously learned customer service insights.

Next, the method 200 for increasing the customer experience performs data fusion 204 by first delivering the gathered data as an input into one or more customer experience improvement modules and then performs one or more process of data mining, fusion and analysis of structured and unstructured data, and applying one or more prediction models or algorithms, etc. The customer experience improvement module then outputs insights that are used to increase customer experience and customer satisfaction in future customer-agent interactions.

In some embodiments of the invention, the insights provide a better understanding of future customers and provide a deliverable analysis of the key drivers of customer experience. In some embodiments of the invention, one or more customer experience improvement modules produce recommendations used by agents in the customer service department to improve their performance.

The method 200 for increasing the customer experience reports the insights and recommendations to the client 205. The client is encouraged to apply the insights 206. Subsequently, the client analyzes 207 how the insights may have improved customer satisfaction.

Figure 2B:
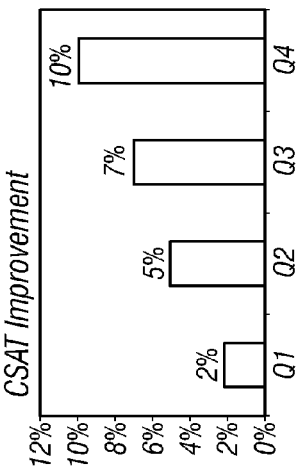
FIG. 2B illustrates a sample timeline of a subscription to a data fusion service according to some embodiments of the invention.
Figure 2B:
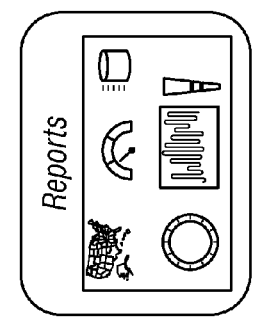
Figure 2B:
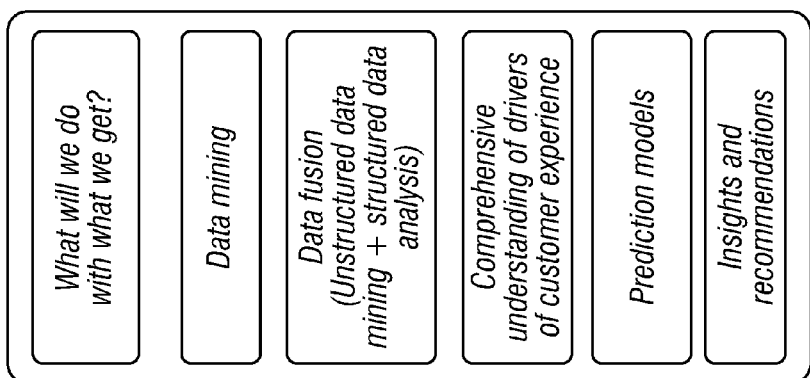
Figure 2B:
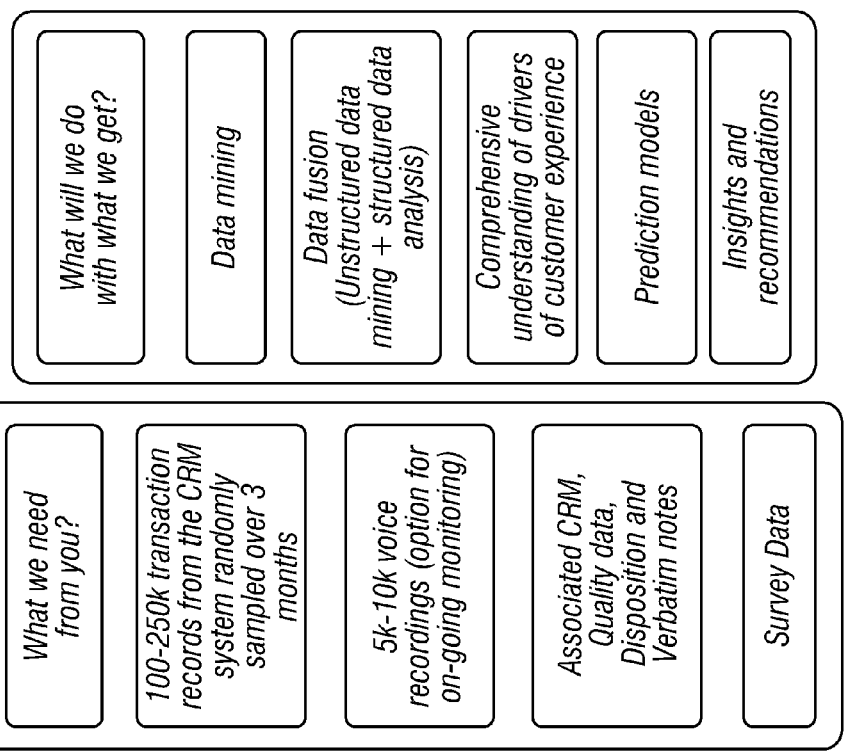
Figure 2C:
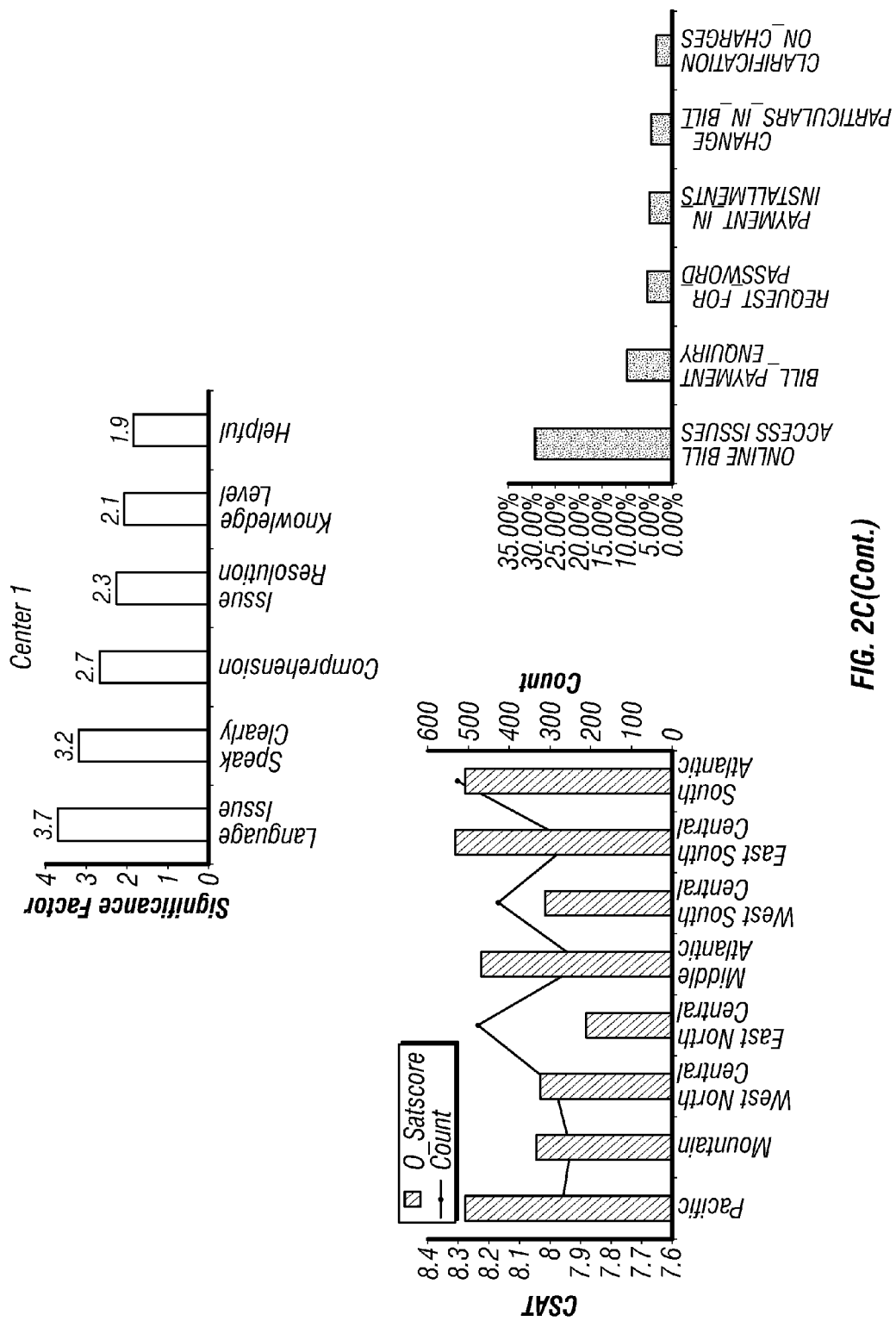
FIG. 2C illustrates a sample of the types of reporting that can delivered to a client using the disclosed methods and apparatuses according to some embodiments of the invention.

FIG. 2B illustrates a sample timeline of the lifecycle of a subscription to a data fusion service according to some embodiments of the invention. FIG. 2C illustrates a sample of some types of reporting that is delivered to a client using the method 200 according to some embodiments of the invention.

Interaction Feedback Module and Dynamic Feedback Loop

As explained above, the quality of a customer-agent interaction is measured using a recorded customer-agent interaction. In some embodiments of the invention, a quality assurance process is designed to review the interaction, score the agent's effectiveness, and analyze the design of the quality assurance process.

Figure 3A:
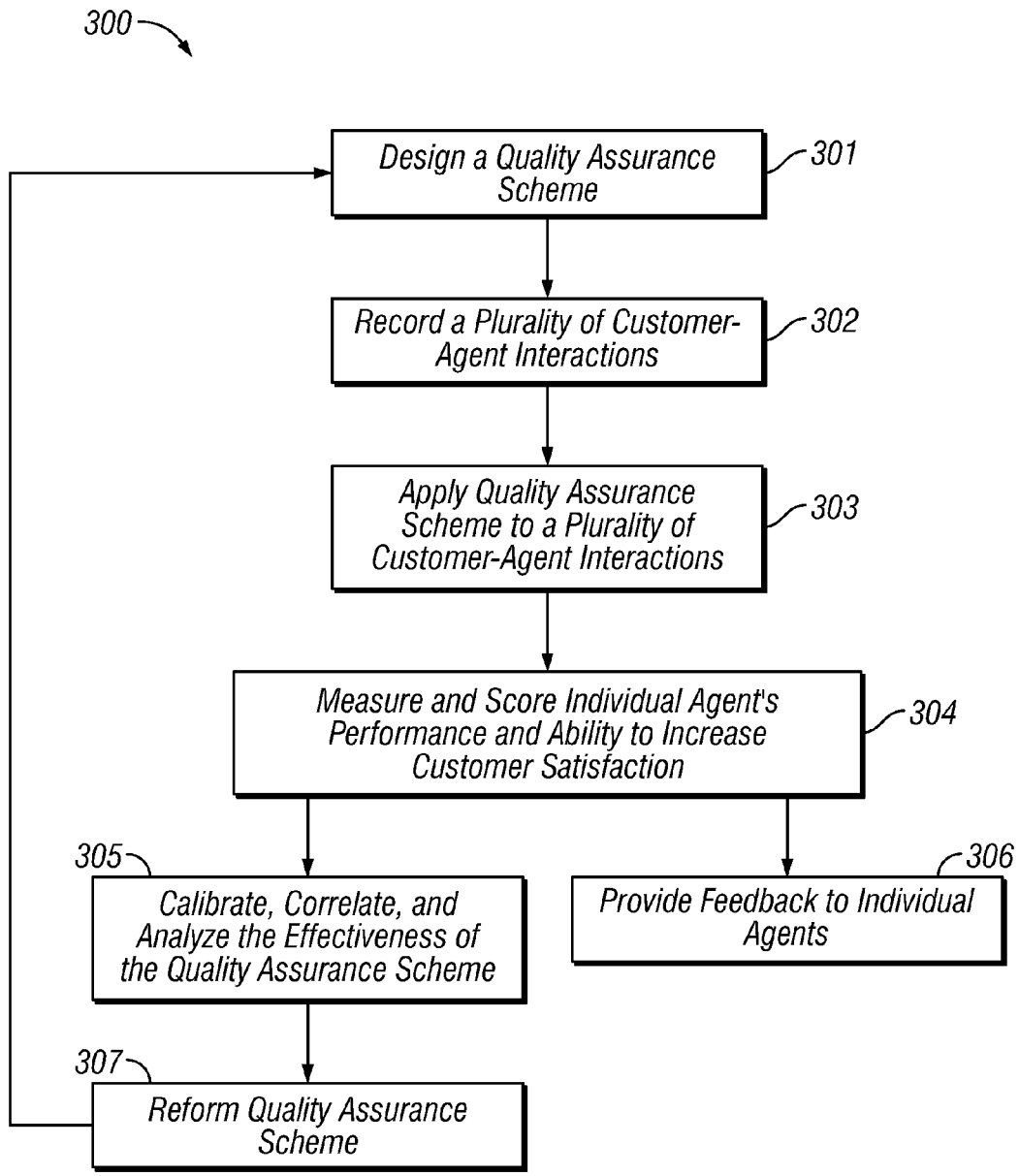
FIG. 3A illustrates a quality assurance process for measuring and analyzing the abilities of an agent according to some embodiments of the invention.

FIG. 3A illustrates a quality assurance process 300 for measuring and analyzing the abilities of an agent according to some embodiments of the invention. The process 300 begins by designing a quality assurance scheme 301 and recording a plurality of customer-agent interactions 302.

The process 300 for measuring and analyzing the abilities of an agent continues by applying the quality assurance scheme to a plurality of customer-agent interactions 303. Next, the agents' performance is scored during customer-agent interactions based on the agents' ability to increase customer satisfaction 304. Subsequently, feedback is delivered to the agents 306.

Figure 3B:
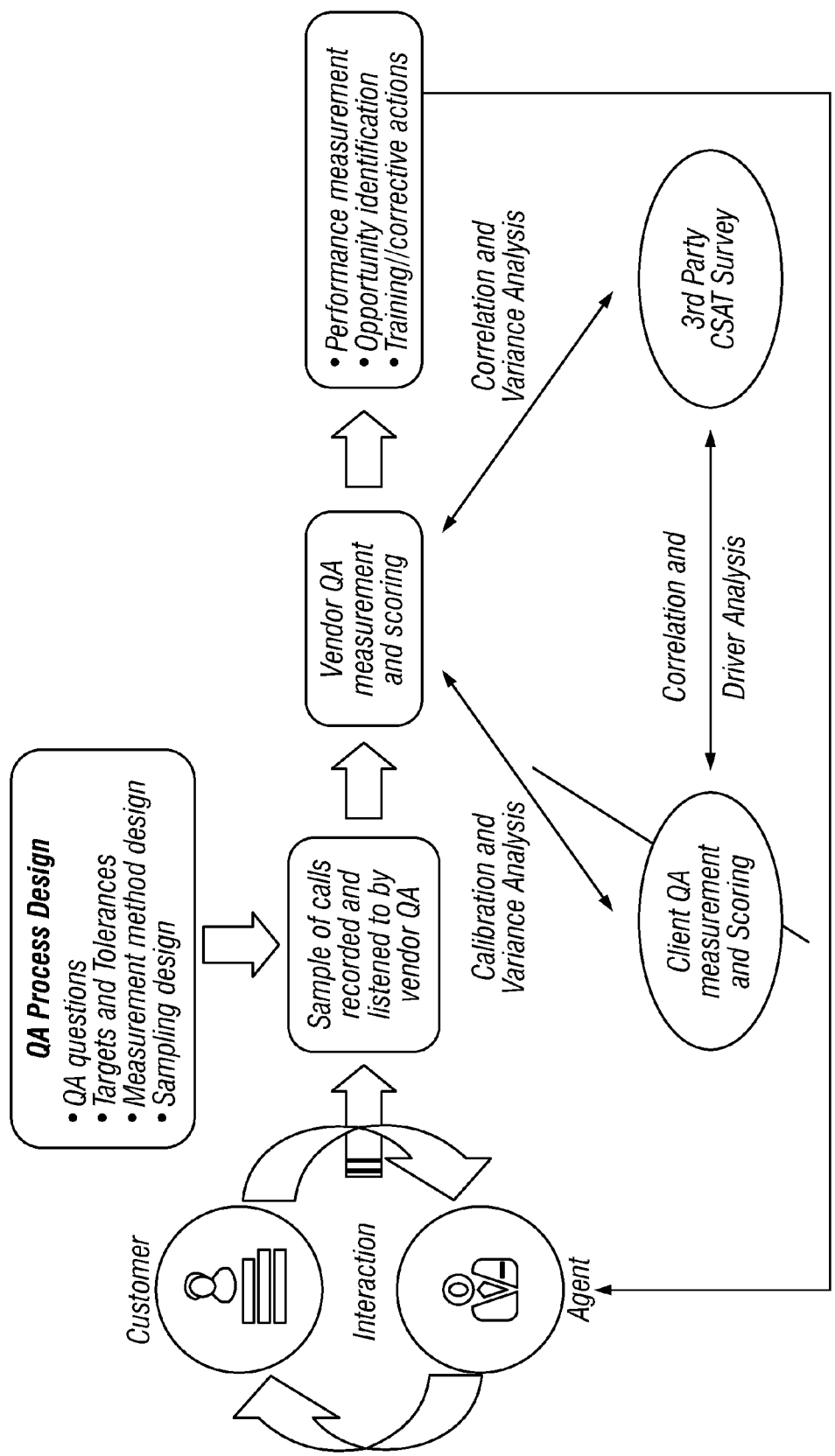
FIG. 3B illustrates another sample process for measuring and analyzing the abilities of an agent according to some embodiments of the invention.

Alternatively, the scores are used to calibrate, correlate, and analyze the effectiveness of the quality assurance scheme 305. Using the correlations and the analysis of the scores, the quality assurance scheme is reformed 307 to better measure performance. The process 300 is reiterative, such that the reformed quality assurance scheme is used in place of the original scheme. FIG. 3B illustrates another sample process for measuring and analyzing the abilities of an agent according to some other embodiments of the invention.

Figure 3C:
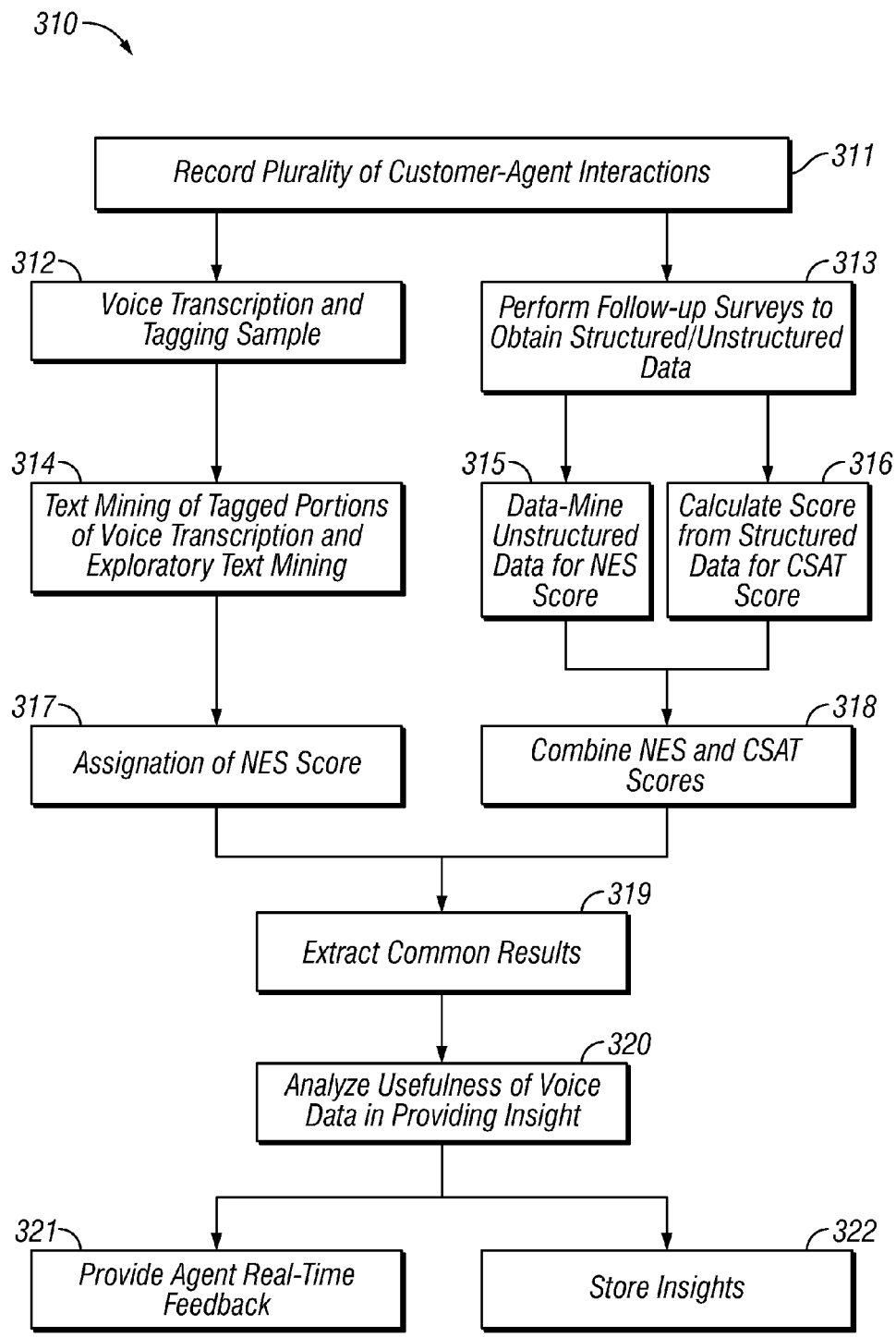
FIG. 3C illustrates a process of providing dynamic feedback after data-mining a customer-agent interaction according to some embodiments of the invention.
Figure 4A:
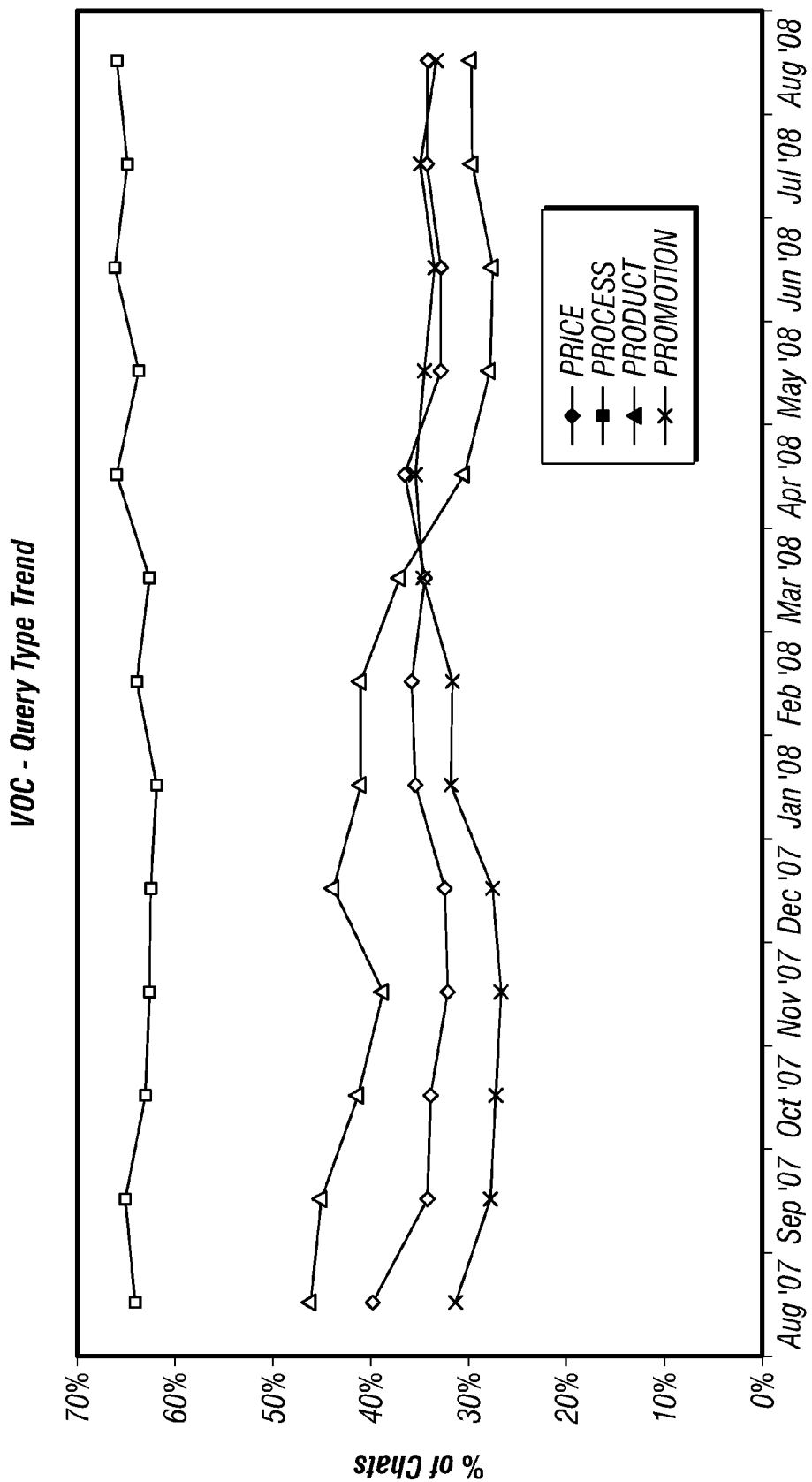
FIG. 4A is a graphical representation of an exemplary deliverable insight that categorizes queries related to loan products according to some embodiments of the invention.
Figure 4B:
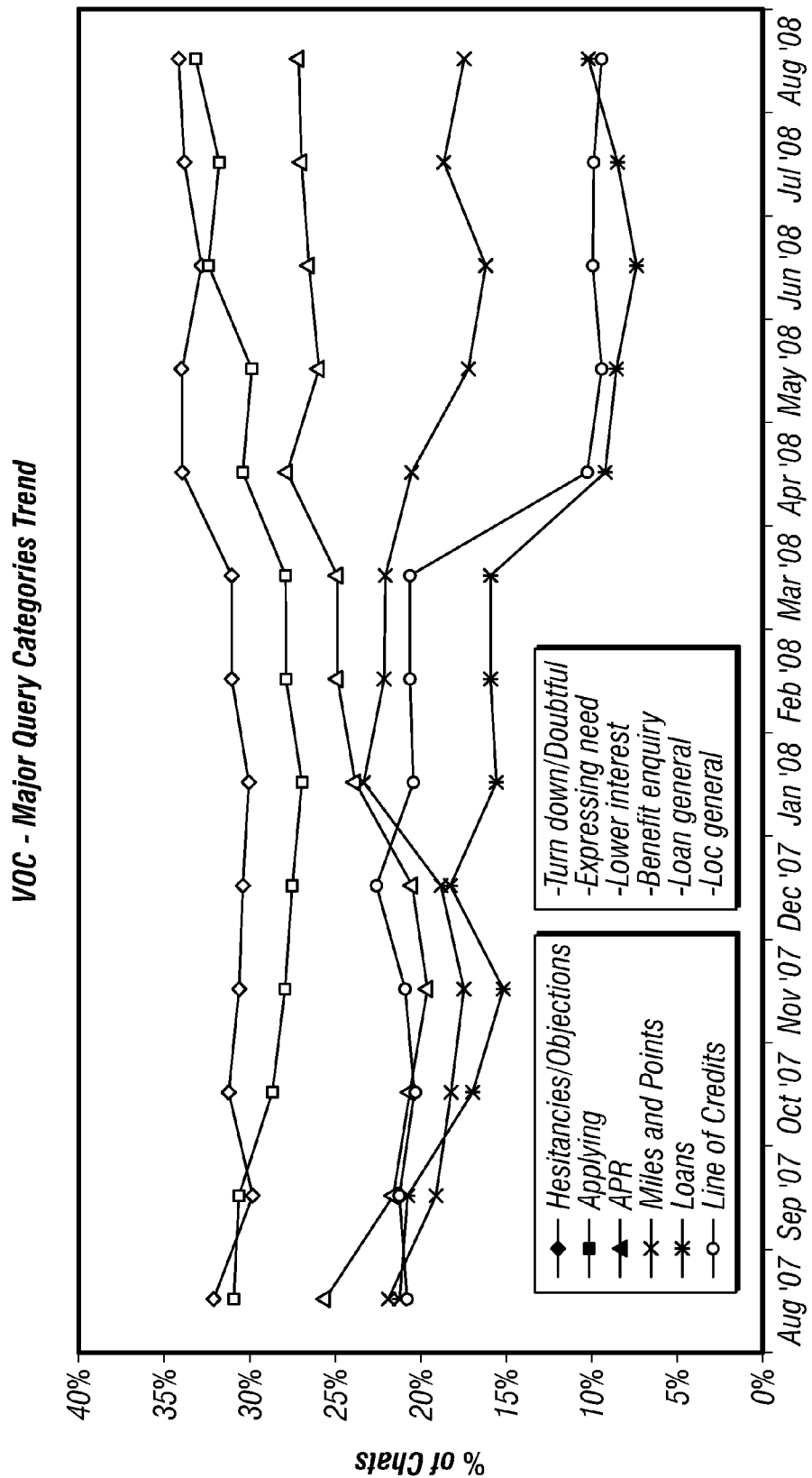
FIG. 4B is a graphical representation of another exemplary deliverable insight that categorizes queries related to loan products according to some embodiments of the invention.
Figure 4C:
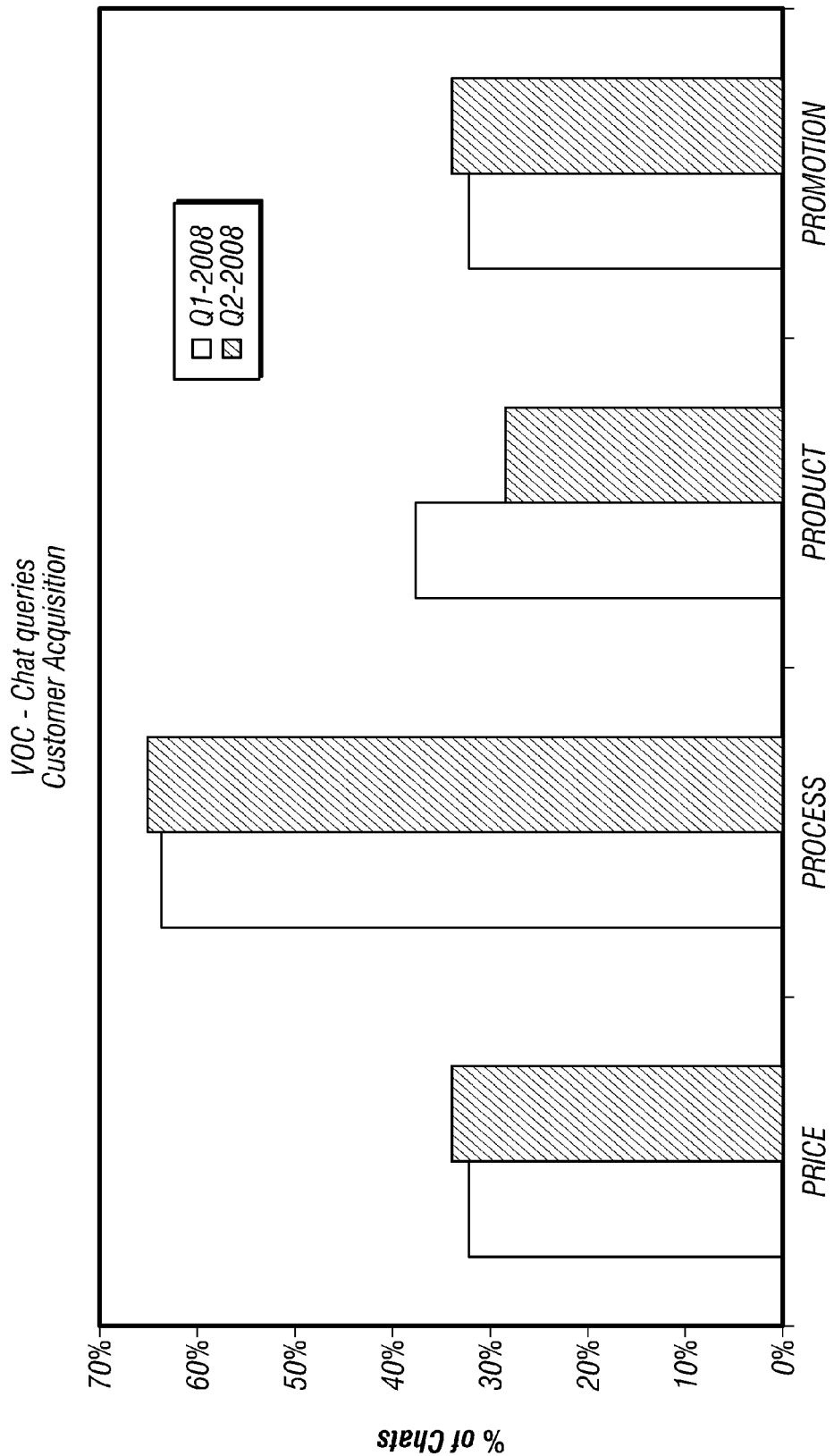
FIG. 4C is a graphical representation of another exemplary deliverable insight that categorizes queries related to loan products according to some embodiments of the invention.
Figure 4D:
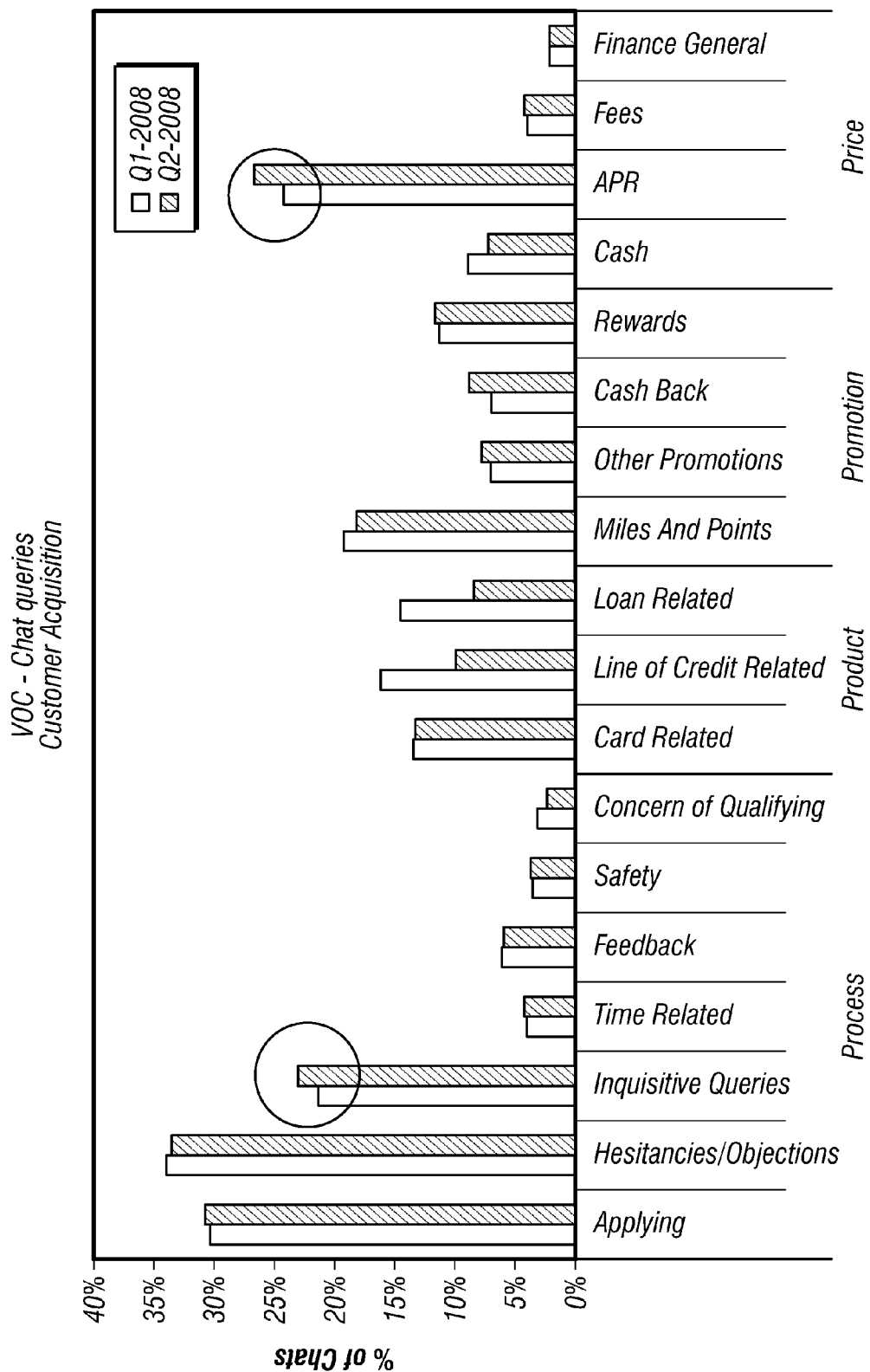
FIG. 4D is a graphical representation of another exemplary deliverable insight that categorizes queries related to loan products.

In some other embodiments of the invention, a process of data-mining is performed on the customer-agent interactions. The process of data-mining results in structured and unstructured data that is analyzed for insights which provide useful feedback to agents or that are stored for future use. FIG. 3C, illustrates a process 310 of providing dynamic feedback after data-mining a customer-agent interaction according to some embodiments of the invention. The process 310 begins by recording a plurality of customer-agent interactions 311.

In some embodiments of the invention, the recorded interactions are transcribed and the key words in the transcriptions are tagged 312. Next, the tagged portions are mined for relevant text 314. Optionally, an ancillary process of exploratory text mining is performed on the non-tagged portions of the interaction transcriptions to identify undiscovered patterns in the interaction data. The text mining culminates in the assignment of a net experience score (NES score), an agent performance score (APS score), or both. An NES score is a measurement of customer experience. The Net experience score can be weighted using an algorithm with weights determined based on the customers' interaction channel, life cycle stages, issue type and several other attributes. The APS score is a function of what the agent did right during the interaction, what the agent did wrong during the interaction, what the customer said about the agent's performance, what products and services were discussed during the interaction, among other variables.

In concert with the steps of mining a transcription 314 and assigning a score, the process 310 also gives follow-up surveys to customers, agents, or both to extract additional information about the interaction. Types of surveys include voice surveys, email surveys, text message surveys, browser-based online surveys, etc. The surveys ask for both structured data and instructed data. For example, a questionnaire asking a survey-taker to respond to predetermined questions results in structured, quantifiable results while a survey requesting a narrative account of the interaction yields unstructured data. Accordingly, structured survey data is analyzed 315 and given a customer satisfaction (CSAT) score and the unstructured data is data-mined for relevant data 316 and given a NES score. The scores are then combined 318.

Next, the process 310 for measuring and analyzing the abilities of an agent continues by correlating the common records from voice mining and from the data obtained from surveys, and extracting common data 319. The correlation of the results provides an in-the-moment analysis of the surveys. Next, the interaction data is scored using the common results 320 in the form of an overall NES score. Additionally, the common results can yield other insightful feedback. The overall NES score and the other insights are either stored 322 or sent to an agent for real-time feedback 321. Preferably, the real-time feedback given to the agent measures performance, identifies opportunities to improve performance, and provides training and corrective actions. The stored feedback provides useful market intelligence for future interactions.

In some embodiments of the invention, the dynamic feedback loop comprises a processing module integrated into the data fusion engine 100. In some other embodiments of the invention, the dynamic feedback loop comprises a stand-alone system. In some embodiments of the invention, the dynamic feedback loop is available to customer service agencies on a subscription/license basis, separate from the subscription to the data fusion engine. In some other embodiments of the invention, the license to a stand-alone dynamic feedback loop module and the data fusion engine 100 are tied. Although specific arraignments are set forth herein, it will be readily apparent to those with ordinary skill in the art that many other configurations and relationships are possible using the data fusion engine 100 and the dynamic feedback loop.

Customer Experience Improvement Modules

As explained above, the data fusion engine 100 includes a plurality of customer experience improvement modules 30, 31, . . . 40, n comprising tools that increase the effectiveness of the data fusion engine's 100 ability to provide business insights about customer service throughout a customer service lifecycle. In some embodiments of the invention, the customer experience improvement modules comprise hardware modules coupled with processor 26 of the data fusion engine 100.

Listed below are examples of some customer experience improvement modules. A person with ordinary skill in the art, having the benefit of this disclosure, will readily appreciate that the data fusion engine 100 is scalable and can be updated to include additional customer experience improvement modules that are now known or developed in the future.

Voice Text Mining Module

In some embodiments of the invention, a voice text mining module derives high quality information from unstructured business data. This is highly beneficial because the most useful business data is oftentimes in an unstructured format, i.e. consumer reports, emails, documents, chats, logs, etc.

The text mining module first organizes the unstructured data and then extracts business relevant information from the structured data. The text mining module then analyzes the extracted data to identify business insights.

The text mining module also reveals the tone of a customer-agent interaction for improving agent performance, categorizes customers, identifies recurring patterns and trends, and introduces new business ideas to the system.

Problem Type/Query Type (PT/QT) Categorization Module

In some embodiments of the invention, a PT/QT categorization module uses unstructured text data to build a query categorization framework that is traditionally built using forms filled out by agents after customer calls. The query categorization framework comprises a human-readable report that provides insights to agents.

The PT/QT categorization module provides an automated solution that is far more dynamic and not dependent on static disposition forms traditionally filled out by a potentially biased or inaccurate agent. The PT/QT categorization module uses customer chats, emails, blogs, community websites, transcribed voice calls, and the agents' notes on voice calls, among other sources that will be apparent to those having ordinary skill in the art.

In some embodiments of the invention, customer queries are categorized by their relative place within the normal course of a typical customer or typical product lifecycle. In some embodiments of the invention, a problem may be categorized by other dimensions such as customer segment, process, geo-demographics, etc. For example, problems related to cell phone roaming, signal, and connectivity issues are categorized by the subscriber's region. In some other embodiments of the invention, queries are categorized in multiple ways, thereby extracting a plurality of insights from a single set of queries. FIGS. 4A-4E illustrates graphical representations of trends analyzed using categorizing queries related to loan products. FIGS. 4A-4E represent typical deliverable insights that are derived from the process of problem type/query type categorization.

Web-Mining Module

In some embodiments of the invention, a web-mining module uses web-mining tools such as web-scraping software, web-crawling software, and text-mining tools, etc., to derive useful business insights from the Internet. The web-mining module applies the tools to data-mine message board conversations, blogs, and other community sites. The web-mining module also analyzes the comments, reviews and products comparisons collected from the websites. The web-mining module then uses the mined data to identify key issues of customer satisfaction. Preferably, each issue is evaluated with net experience score (NES score).

Area of Customer Service Improvement Opportunity Identification Module

Figure 5:
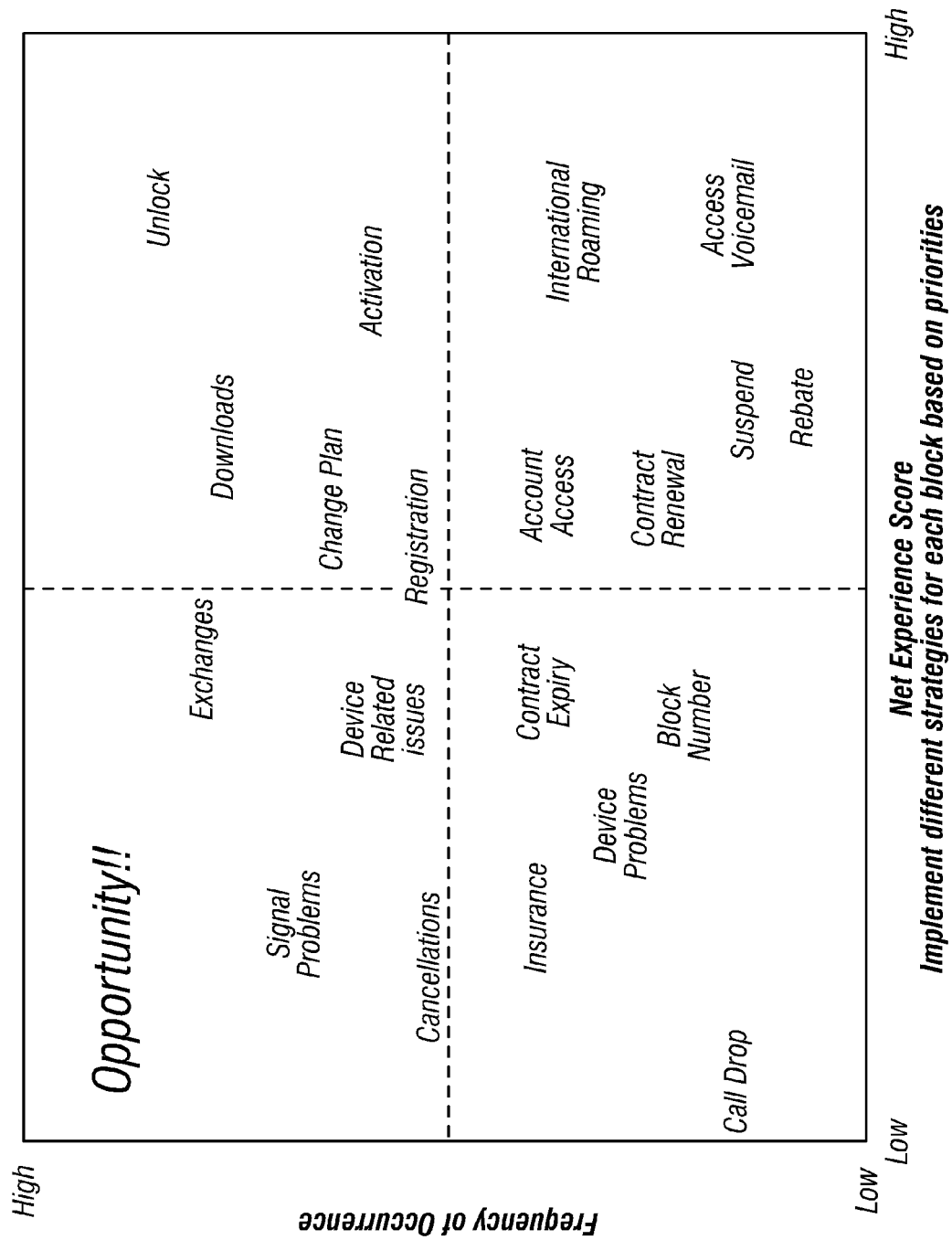
FIG. 5 illustrates an example of an output from a customer service improvement opportunity identification module according to some embodiments of the invention.

In some embodiments of the invention, an area of customer service improvement opportunity identification module uses data relating to the frequency of particular types of customer services queries and compares that data to the cumulative past NES scores relating to those queries. The area of customer service improvement opportunity identification module identifies areas where increases in NES will yield the most opportunity. FIG. 5 illustrates an example of an output from an area of customer service improvement opportunity identification module.

Cognitive Category Model (CCM) Module

In some embodiments of the invention, a CCM module identifies and groups categories of interaction tone. First, the CCM module is trained to learn to identify and categorize interaction tone using a taxonomy/dictionary specifically built in for this purpose. Next, the CCM module categorizes the tone of each interaction as a favorable-, unfavorable-, or moderate-toned interaction. Thereafter, the CCM module develops a strategy for treating each customer, based on the tone category. In some embodiments of the invention, the strategy comprises sending a textual alert to an agent, instructing the agent how to perform. For example, a text alert can instruct an agent to maintain the tone of a favorable-toned chat and instruct the agent to try to influence a sale. Alternatively, the text alert can instruct an agent to convert the tone when the interaction is unfavorable or moderate. The tone categories also identify which agents are most effective at changing the tone of a chat from negative to positive.

In some embodiments of the invention, the agents who are most effective at changing tone are assigned to deal with customer service calls that are identified as originating from a potentially irate customer by the proactive problem prediction module, explained below.

Neurolinguistics Processing Module

According to some embodiments of the invention, a neurolinguistics processing module categorizes customers into three prominent groups namely: audio, visual, and kinesthetic by the language they use. An agent can adopt a preferred style of chat that appeals better to the customer by recognizing the perception type of the customer. The neurolinguistics processing module uses predefined strategies for treating the customer after identifying a category.

For example, when the neurolinguistics processing module recognizes an audio-type customer, the agents are encouraged to verbally list all the facts relating to the product or service, they are encouraged to verbally relay all of the advantages of the products, they are instructed never to verbally insist that the customer do something, and the agents are reminded that it may not be easy to up-sell verbally.

In another example, when the neurolinguistics processing module recognizes a verbal-type customer, the agents are encouraged to make use of all possible available ways to project an item as visually appealing, and encouraged not to forget to try to up-sell because success is more likely.

In yet another example, when the neurolinguistics processing module recognizes a kinesthetic-type customer, the agents are reminded that those people who kinesthetically-minded will respond better if allowed to try the item, the agents are encourage to point out if a trial period exits, and they are reminded that if a customer is given an opportunity to physically inspect a product, they will be more inclined to take an up-selling recommendation seriously.

Statistical Modeling Module

In some embodiments of the invention, a statistical modeling module predicts a consumer's propensity to buy certain goods or services, propensity to agree to up-selling or cross-selling, brand loyalty, brand attrition, etc. The statistical modeling module utilizes models built from structured textual customer attributes that are structured based on results from a query categorization module as well as other modules.

In some embodiments of the invention a predictive model measures customer attrition by analyzing chat text data. The model provides a view of what drives customer attrition from the provider of a product or a service provider based on the customers' concerns expressed through one or more channels of communication. A method of predicting patterns of attrition uses text mining tools to extract data from text chat and convert the extracted data into useful structured data. The method uses categorical variables specifically created to enable statistical modeling of the structured data. In some embodiments, the method is also fuses structured and unstructured data. In some embodiments of the invention, the method measures propensity for attrition based on a customer's stated intent to cancel.

In some embodiments of the invention, a predictive model based on logistic regression and structural equation modeling was built relating attrition to a plurality of customer attributes according to the following relationship:

$$P(Y = \text{Attrition}|x_1, x_2 \ldots x_n) = \frac{e^\Psi}{1+e^\Psi} \tag{1}$$

where:

$$\Psi = \beta_0 + \beta_1 x_1 + \beta_2 x_2 \ldots \beta_n x_n \tag{2}$$

where:

$\beta_0$ through $\beta n$ represent weighted coefficients, (3)

and where:

x1-xn are various customer attributes. (4)

Figure 6:
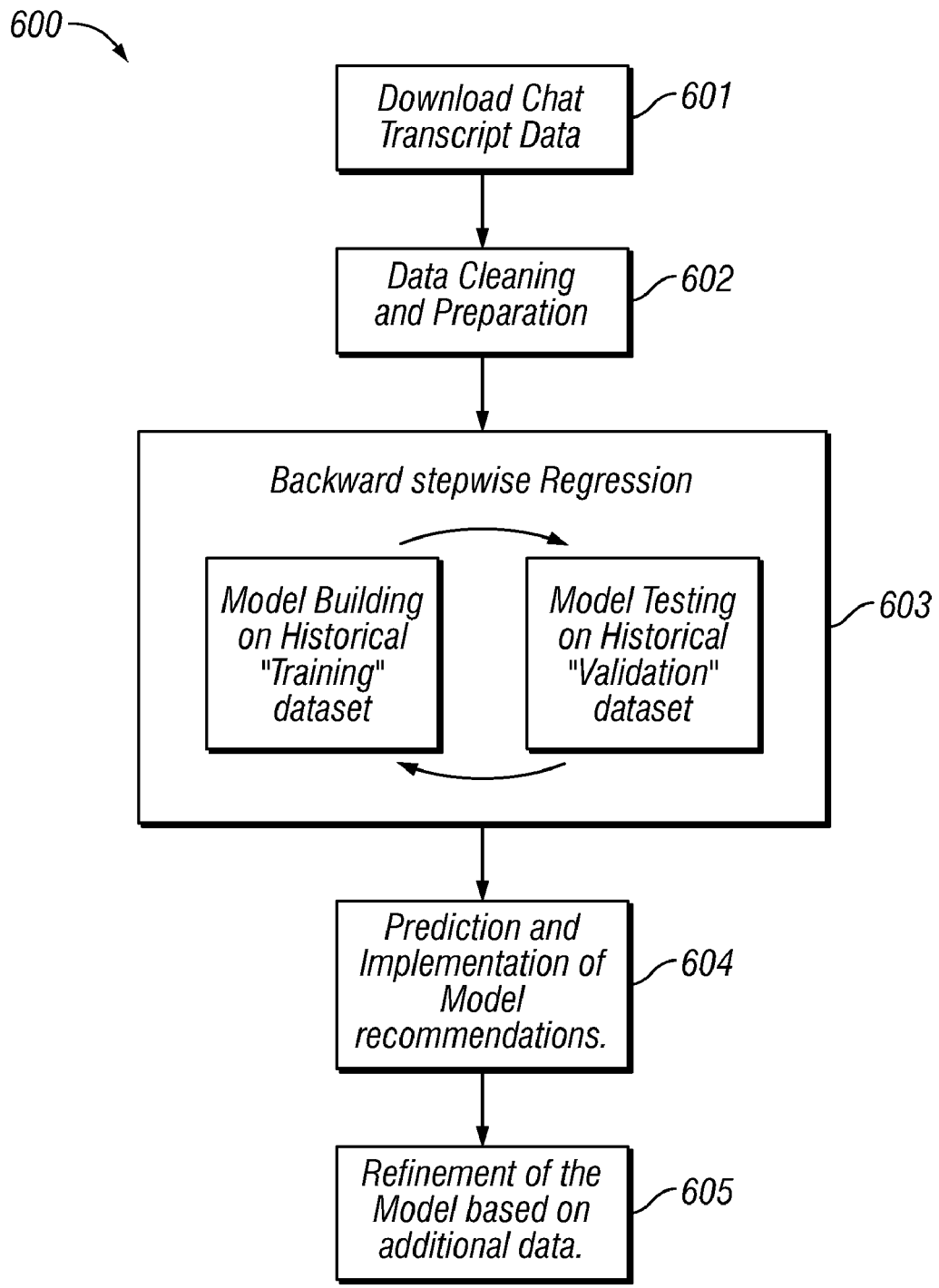
FIG. 6 illustrates the statistical model development process according to some embodiments of the invention.

FIG. 6 illustrates the statistical model development process according to some embodiments of the invention. The process 600 involves the steps of downloading chat transcript data from an Instant Service 601, data cleaning and preparation 602, a step of backward stepwise regression 603, prediction and implementation of model recommendations 605, and refinement of the model based on additional data 605. The process results in a statistical model that delivers recommendations to customer service agents.

In some embodiments of the invention, the recommendations identify key issues brought up by the customers about goods or services which historically receive a low NES score. In some embodiments of the invention, the recommendations address specific issues with particular goods or services proactively. For example, a recommendation by include an email or link to a web video describing how to solve problems associated with a particular product problem. In some embodiments of the invention, the recommendation comprises a text message sent to a customer explaining how to resolve their issue. For example, in a customer service call about international cellular phone coverage, a text message may be sent which explains roaming charges to international travelers to provide roaming charge information from a FAQ.

In some other embodiments of the invention, the recommendation may signal problems that are the key drivers of a poor NES score. In some other embodiments of the invention, the recommendations relate to ways to up-sell or cross-sell goods or services. In some other embodiments of the invention, the recommendations relate to ways to retain a customer when the customer has questions or concerns about contract terms. Although specific recommendations are set forth herein, it will be apparent to those with ordinary skill in the art, having the benefit of this disclosure, that a wide variety of recommendations may be delivered to achieve customer satisfaction and customer retention.

Figure 7:
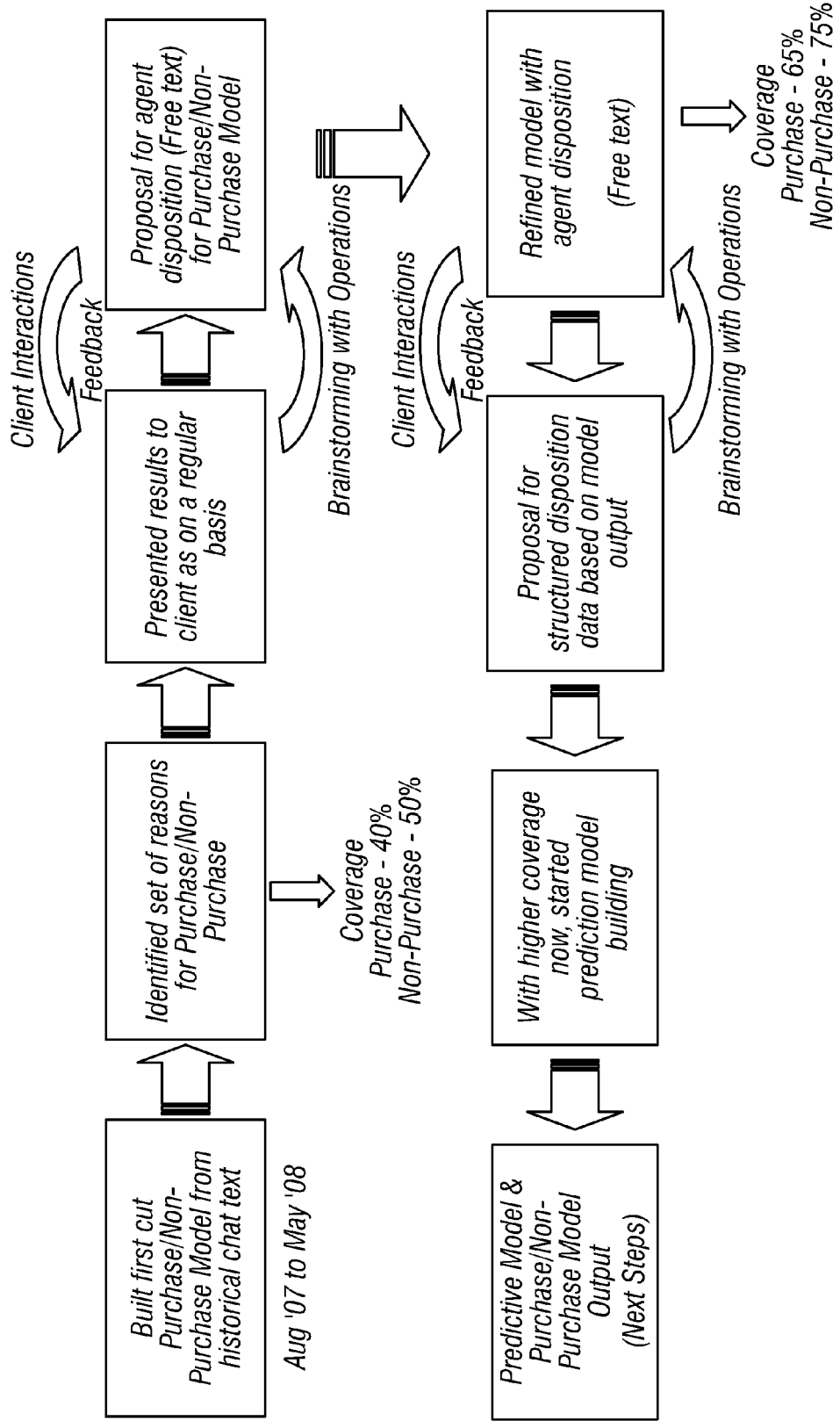
FIG. 7 illustrates a process of building a purchase/non-purchase model according to some embodiments of the invention.

In some embodiments of the invention, a model provides recommendations by analyzing customers' reasons for purchasing and reasons for not purchasing a given product or service offering. A process 700 of building a purchase/non-purchase model is illustrated in FIG. 7.

Insight Generation Module

In some embodiments of the invention, an insight generation module provides agents with insight about customers to improve NES scores. In addition to model building, the insight generation module quickly extracts insights and market intelligence about customers by text-mining customer agent interactions for keywords. For example, if the insight generation module recognizes that a customer asks about travel miles, the insight generation modules gives the agent a notification telling them to recommend that the customer should download free miles-redemption software.

Table 1 illustrates a sample of product insights for real-world data.

Competition Analysis Module

In some embodiments of the invention, a competition analysis module performs data mining on a chat database of a competitor. According to these embodiments, a customer reference to competitors in the chats provides an agent with insight for improving NES score. Instances of reference to competition are studied over a time to refine the effectiveness of the learned insights. In some embodiments of the invention, a more detailed analysis is performed on competition websites that refer to the client's business more than a requisite number of times.

Chat Summarization Module

In some embodiments of the invention, a chat summarization module provides analysts with quick indicative notes on chat data to better understand customer expectations and customer problems in a real-time manner.

Figure 8:
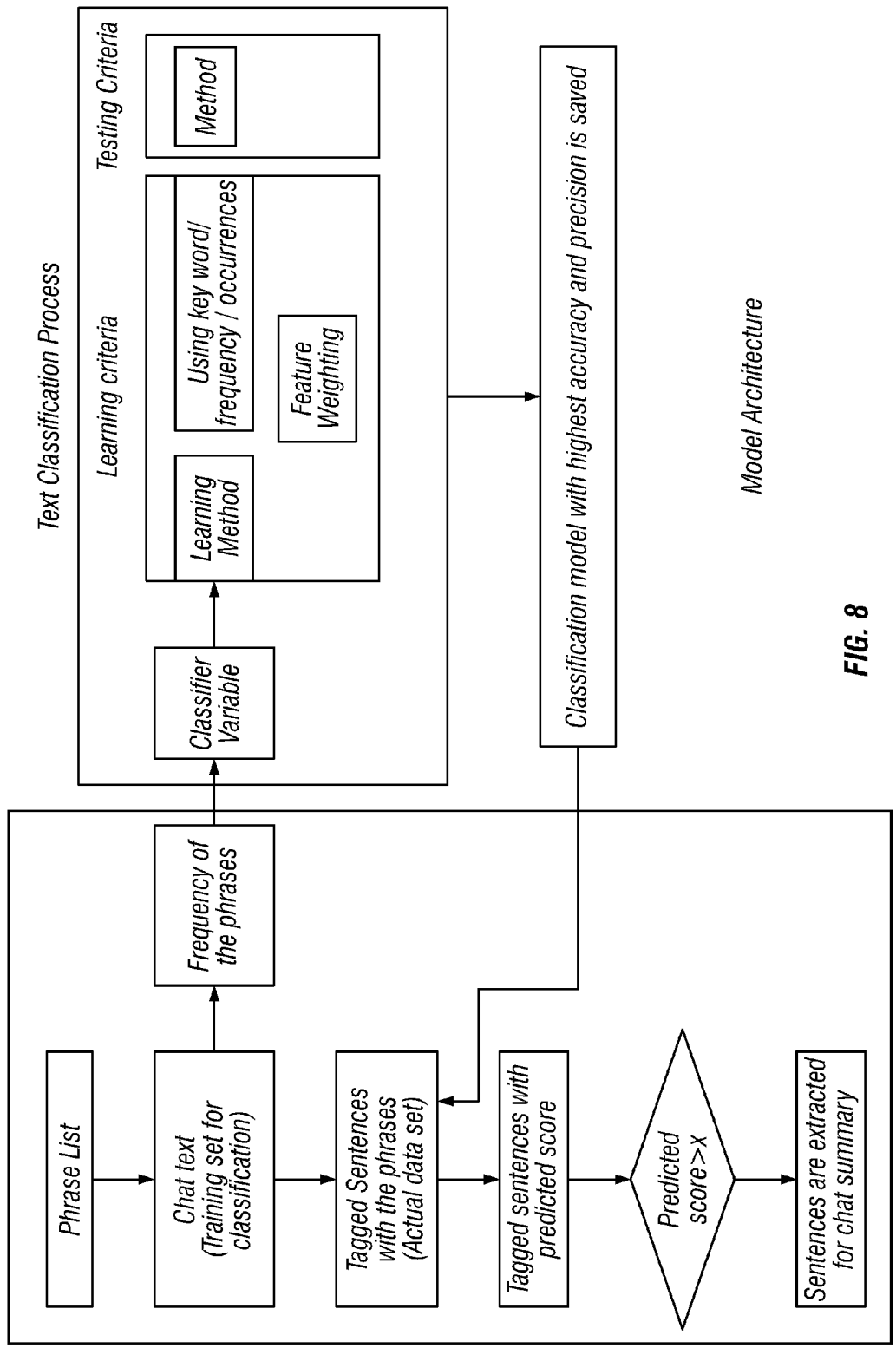
FIG. 8 illustrates an example of chat summarization model architecture according to some embodiments of the invention.

An example of chat summarization model architecture is illustrated in FIG. 8. An analyst using the chat summarization module can effectively train customer service agents to quickly identify customer expectations and curtail customer problems.

Proactive Problem Prediction Module

Figure 9:
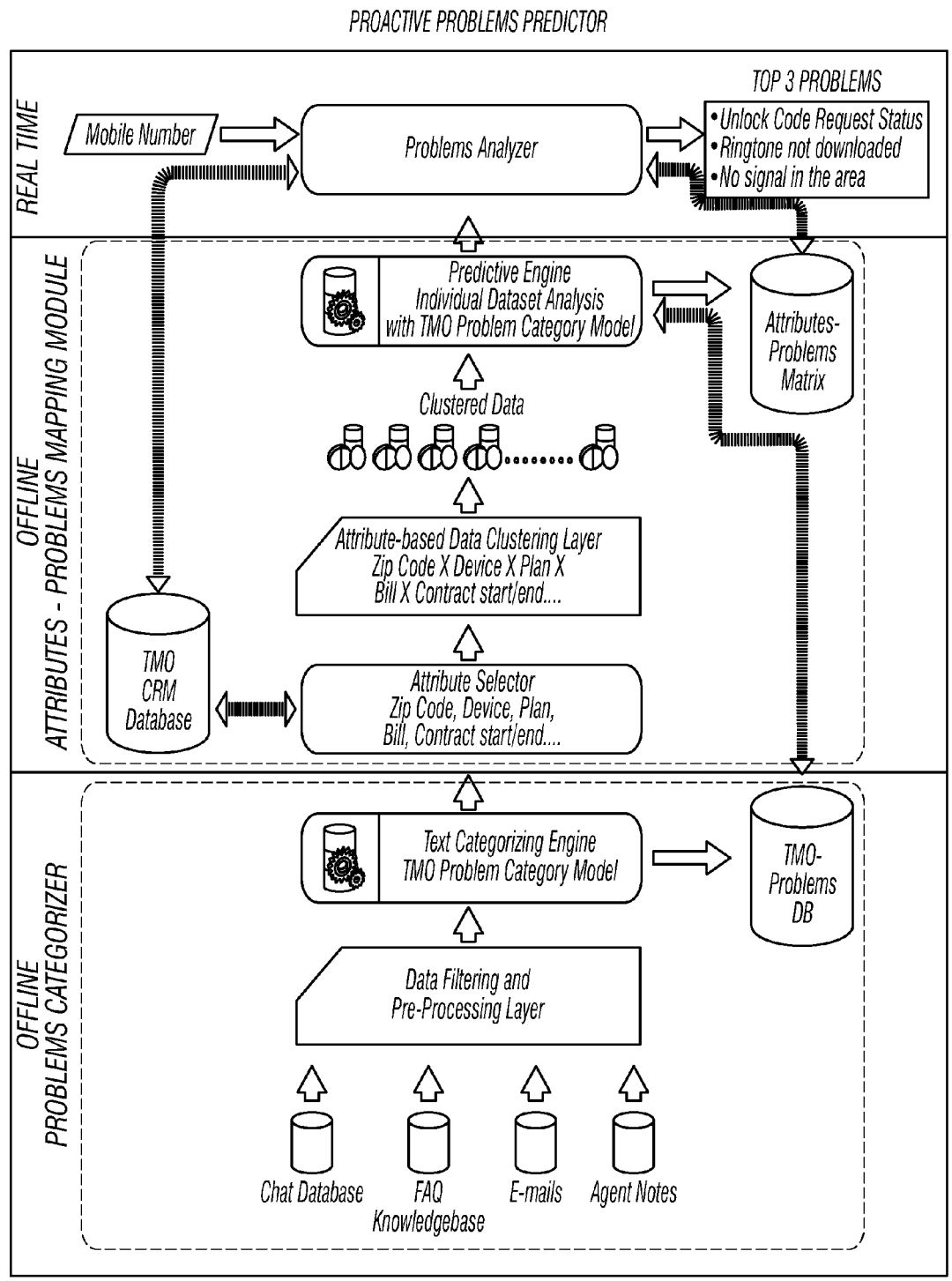
FIG. 9 illustrates a model for proactive problem prediction according to some embodiments of the invention.

In some embodiments of the invention, a proactive problem prediction module automatically predicts an exact problem that a customer wants solved based on basic attributes of the customer. For example, in a cell phone customer service environment, a caller with an area code from a rural location is more likely to be calling about coverage problems than a caller with an area code from a metropolitan area. According to this example, the proactive problem prediction module prepares pre-defined solutions relating to poor cell phone coverage and provides the agent with those solutions upon receiving a call from a rural customer. In some embodiments of the invention, the proactive problem prediction module uses the following customer attributes phone numbers, account information, historical interactions, mailing address, and email address, among others. FIG. 9 illustrates a model for proactive problem prediction according to some embodiments of the invention.

Agent Survey Module

In some embodiments of the invention, an agent survey module is used in concert with consumer surveys to increase customer satisfaction. The integrated customer and agent survey mechanism provides insight into actions that can be taken on the floor to improve customer experience.

TABLE 1

| Title | Customer comment | Suggestion |
| --- | --- | --- |
| Redeeming Miles | Customer seeks more understanding on redeeming miles | A miles-redemption calculator can be provided for a clear understanding |
| Preparations & Requirements | Customer does not know what information are mandatory while applying and unable to complete the application for want of important information such as SSN, EIN etc. | A brief requirements list can be provided to keep all mandatory information ready before starting to fill in the application. |
| Fraud Alert - Account Locks | Locking accounts without Notifications (Citibank) | While locking an account an email/sms can be sent to the card holder immediately |
| More Cards | Customer needs more than 40 small business credit cards and seeks help | Can be referred to Specialist to a different mode of interaction. Customer can be charged a fee for more than 25 cards which is the current limit |
| Recommending A Friend | Customer recommending a friend wants a reward | Customers can be awarded some referral benefits |

Figure 10:
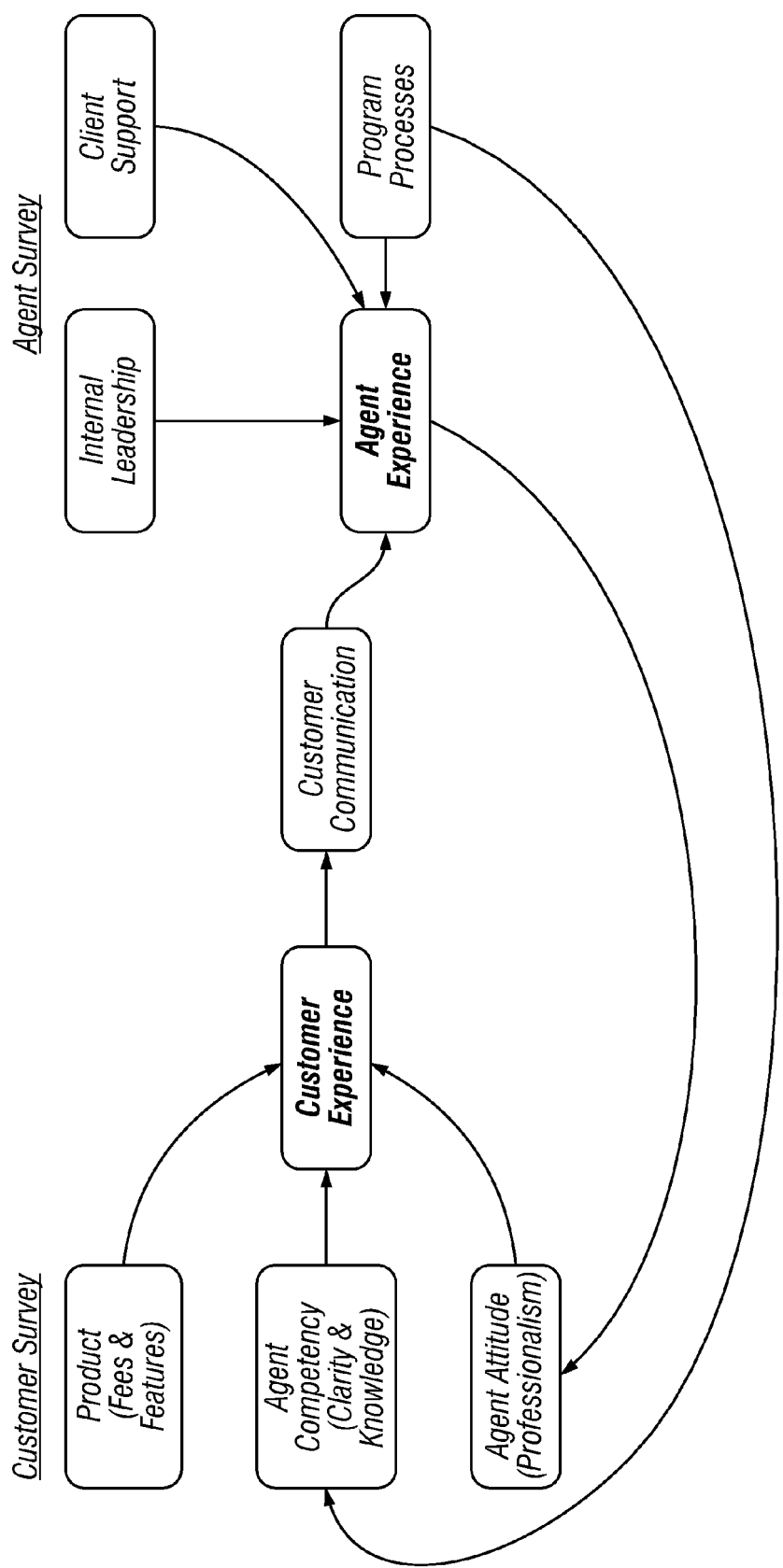
FIG. 10 illustrates a workflow for integrating customer surveys and agent surveys to increase customer satisfaction according to some embodiments of the invention.

FIG. 10 illustrates a workflow for integrating customer surveys and agent surveys to increase customer satisfaction. The results of the agent surveys and customer surveys identify the attributes that drive customer dissatisfaction, and which attributes that have the highest affinity to each other.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method for managing a customer experience throughout a customer service lifecycle, comprising the steps of:
   providing a customer-agent interaction platform;
   conducting an interaction between at least one customer and at least one customer service representative on said customer-agent interaction platform;
   providing a data fusion engine for processing data relevant to a customer experience, wherein said data fusion engine comprises a processor, a memory device coupled to said processor, and a network interface,
   gathering, by the processor, said data relevant to a customer experience from one or more sources, wherein said one or more sources comprise at least said customer-agent interaction platform;
   ingesting said data;
   processing, by the processor, said data using one or more processing modules, forming one or more insights, wherein the step of processing said data further comprises the steps of:
      recording said interaction data;
      transcribing said recorded interaction data into a textual record;
      text mining said textual record for indicators of positive or negative customer experience;
      using said indicators to determine a text-mining net experience score (NES);
      performing at least one follow up survey following said interaction, the follow up survey comprised of a questionnaire asking a survey-taker to respond to predetermined questions, wherein said follow up survey yields results comprising unstructured data and structured data, wherein said structured survey data is analyzed and given a customer satisfaction (CSAT) score, wherein said unstructured data is data-mined for data relevant to the customer experience and given a survey NES, and wherein said CSAT score and said survey NES are combined;
      extracting common results between the text-mining NES and said combined CSAT and survey NES scores, forming an overall NES;
      using said overall NES to analyze the effectiveness of said at least one customer service representative during said interaction;
      providing feedback to said at least one customer service representative relating to said effectiveness; and
      outputting one or more insights.

2. The method of claim 1, wherein said interaction is conducted via any of a phone call, an email, and an instant messaging session.

3. The method of claim 1, wherein said one or more sources are selected from among a group of sources comprising any of:
   said at least one customer;
   said at least one customer service representative;
   said interaction platform;
   one or more community-sponsored data sources;
   one or more industry data sources;
   one or more survey sources;
   one or more third party databases; and
   one or more internal databases.

4. The method of claim 1, wherein the step of processing said data using one or more processing modules further comprises the step of data mining the data relevant to customer experience from one or more sources.

5. The method of claim 1, wherein the step of processing modules comprises using a processing module selected from among a group of processing modules comprising any of:
   a problem type/query type categorization module;
   a web text mining module;
   an area of customer service improvement opportunity identification module;
   a cognitive category model module;
   a neurolinguistics processing module;
   a statistical modeling module;
   an insight generation module;
   a competition analysis module;
   a chat summarization module;
   a proactive problem prediction module;
   an agent survey module; and
   combinations thereof.

6. The method of claim 1, wherein said data relevant to customer experience comprises data selected from among a group of data comprising any of:
   customer-agent interaction data;
   Customer Relationship Management (CRM) data;
   geography indicator information;
   customer history;
   customer demographics;
   data from online forums;
   data from blogs;
   data from short message format personal media feeds; and
   combinations thereof.

7. An apparatus for managing a customer experience throughout a customer service lifecycle, comprising:
   a customer-agent interaction platform for conducting an interaction between at least one customer and at least one customer service representative and for memorializing said one or more interactions, in the form of interaction data;
   a survey module for conducting one or more surveys and for memorializing the results of said one or more surveys in the form of survey data;
   a data fusion engine for gathering interaction data and survey data that is relevant to said customer experience, and for processing the gathered data, wherein the data fusion engine comprises:
      a processor;
      a memory device coupled to said processor;
      a network interface; and
      one or more customer experience improvement modules configured for ingesting said gathered data, and outputting one or more insights;
   wherein at least one of the one or more processing modules comprise a dynamic feedback loop module, wherein said dynamic feedback loop module is configured for:
      recording said interaction data;

transcribing said recorded interaction data into a textual record;

text mining said textual record for indicators of positive or negative customer experience; and using said indicators to determine a text-mining net experience score (NES);

performing at least one follow up survey following said interaction, the follow up survey comprised of a questionnaire asking a survey-taker to respond to predetermined questions, wherein said follow up survey yields results comprising unstructured data and structured data, wherein said structured survey data is analyzed and given a customer satisfaction (CSAT) score, wherein said unstructured data is data-mined for data relevant to the customer experience and given a survey NES, and wherein said CSAT score and said survey NES are combined;

extracting common results between the text-mining NES and said combined CSAT and survey NES scores, forming an overall NES;

using said overall NES to analyze the effectiveness of said at least one customer service representative during said interaction; and providing feedback to said at least one customer service representative relating to said effectiveness.

8. The apparatus of claim 7, wherein said one or more surveys are conducted via any of a phone call, an email, a website, and a text message.

9. The apparatus of claim 7, wherein said interaction comprises any of a phone call, an email session, and an instant messaging session.

10. The apparatus of claim 7, wherein said one or more surveys are selected from among a group of sources comprising any of:
 said at least one customer;
 said at least one customer service representative;
 said interaction platform;
 one or more community-sponsored data sources;
 one or more industry data sources;
 one or more survey sources;
 one or more third party databases; and
 one or more internal databases.

11. The apparatus of claim 7, wherein at least one of the one or more processing modules comprise a data mining module for data mining the data relevant to customer experience from one or more sources.

12. The apparatus of claim 7, wherein at least one of the one or more processing modules comprise a processing module selected from among a group of processing modules comprising any of:
 a problem type/query type categorization module;
 a web text mining module;
 an area of customer service improvement opportunity identification module;
 a cognitive category model module;
 a neurolinguistics processing module;
 a statistical modeling module;
 an insight generation module;
 a competition analysis module;
 a chat summarization module;
 a proactive problem prediction module;
 an agent survey module; and
 combinations thereof.

13. The apparatus of claim 7, wherein said data relevant to customer experience comprises data selected from among a group of data consisting of:
 customer-agent interaction data;
 Customer Relationship Management (CRM) data;
 geography indicator information;
 customer history;
 customer demographics;
 data from online forums;
 data from blogs;
 data from short message format personal media feeds; and
 combinations thereof.

* * * * *